United States Patent [19]
Salesin et al.

[11] Patent Number: 5,847,712
[45] Date of Patent: *Dec. 8, 1998

[54] METHOD AND SYSTEM FOR GENERATING GRAPHIC ILLUSTRATIONS ACCORDING TO A STROKE TEXTURE AND A TONE

[75] Inventors: David H. Salesin; Georges Winkenbach; Michael P. Salisbury, all of Seattle; Sean Anderson, Woodinville, all of Wash.; Ronen Barzel, San Francisco, Calif.

[73] Assignee: University of Washington, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 368,226

[22] Filed: Jan. 3, 1995

[51] Int. Cl.⁶ .................................................. G06T 11/40
[52] U.S. Cl. .......................... 345/430; 345/428; 345/429
[58] Field of Search .................................... 395/128–135, 395/139, 141, 155, 161; 348/179; 382/240, 249, 260

[56] References Cited

U.S. PATENT DOCUMENTS

| | | | |
|---|---|---|---|
| 4,958,272 | 9/1990 | Wake | 345/432 |
| 5,063,448 | 11/1991 | Jaffray et al. | 348/578 |
| 5,155,813 | 10/1992 | Donoghue et al. | 345/179 |
| 5,182,548 | 1/1993 | Haeberli | 345/113 |
| 5,185,816 | 2/1993 | Takatori et al. | 382/160 |
| 5,230,039 | 7/1993 | Grossman et al. | 345/430 |
| 5,239,292 | 8/1993 | Willan | 345/135 |
| 5,245,432 | 9/1993 | Jaffray et al. | 348/578 |
| 5,307,452 | 4/1994 | Hahn et al. | 345/432 |
| 5,347,620 | 9/1994 | Zimmer | 345/429 |
| 5,428,722 | 6/1995 | March et al. | 345/433 |
| 5,432,896 | 7/1995 | Hwong et al. | 345/429 |
| 5,434,959 | 7/1995 | Von Ehr, II et al. | 345/441 |
| 5,448,651 | 9/1995 | Sakou et al. | 382/176 |
| 5,465,325 | 11/1995 | Capps et al. | 345/441 |
| 5,559,942 | 9/1996 | Gough et al. | 345/349 |

OTHER PUBLICATIONS

Jensen et al., Harvard Graphics: The Complete Reference, p. 592, 602–604, 1990.
Fractal Design, Painter User Manual Version 1.2 for Macintosh, pp. 49–87, 1992.
Stetson, Painter Easily Adds a Dash of Artistic Flair, PC Week, v.9,n.14,pp. 42 and 44, Apr. 6, 1992.
Simone, Updated Fractal Design Painter Dazzles, PC Magazine, pp. 37 and 39, May 11, 1993.
Anis, Fractal Design Intros Painter 3.0 For Windows, Newsbytes, Record #16–213–928, Aug. 25, 1994.
Long, PixelPaint Pro3 Combines Image Editing, Painting, MacWeek, v.8, n.14, p. 43(2), Apr. 4, 1994.
Biedny et al., The Official Adobe Photoshop Handbook, 1991, pp. xxix, 2, 6, 87–98,130–137,143–153, 183–184, 197–201, 224–226, 259,303–306, 373–374, 375, 398–399, 1991.
Guptill, Rendering in Pen and Ink, 1976, pp. 29–31, 1976.
Strassmann, Hairy Brushes, ACM SIGRAPH, Aug. 1986, pp. 225–232, Aug. 1986.
Fractal Design Corporation, "Painter 3 User Guide for Macintosh," Chapter 8: Cloning, pp. 189–205, Nov. 1994.
Salisbury, Michael et al., Interactive Pen–and–Ink Illustration, Technical Report 94–01–07, University of Washington, Jan. 5, 1994.
Winkenbach, Georges and David H. Salesin, Computer Generated Pen–and–Ink Illustration, Technical Report 94–01–08, University of Washington, Jan. 21, 1994.

(List continued on next page.)

Primary Examiner—Anton Fetting
Attorney, Agent, or Firm—Ronald M. Anderson

[57] ABSTRACT

A method and apparatus for generating an illustration having the steps of inputting a plurality of strokes in an area having a designated dimension, assigning a texture and tone to the area, where the tone determines the nature and quantity of the plurality of strokes, generating the texture and the tone assigned in that portion of the illustration, and outputting the illustration.

38 Claims, 26 Drawing Sheets

OTHER PUBLICATIONS

Berman, Deborah F. et al., *Multiresolution Painting and Compositing*, Technical Report 94–01–09, University of Washington, Jan. 5, 1994.

Finkelstein, Adam and David H. Salesin, *Multiresolution Curves*, Technical Report 94–01–06, University of Washington, Jan. 5, 1994.

Chui, Charles K. and Ewald Quak, "Wavelets on a Bounded Interval," *Numerical Methods of Approximation*, vol. 9, Dietrich Braess and Larry Schumaker (eds)., pp. 53–75, 1992.

Kamada, Tomihisa and Satoru Kawai, "An Enhanced Treatment of Hidden Lines," *ACM Transactions on Graphics* 6:(4), pp. 308–322, 1987.

Dooley, Debra and Michael F. Cohen, "Automatic Illustration of 3D Geometric Models: Lines," *Computer Graphics* 24:(2), pp. 77–82, 1990.

Appel, Arthur et al., "The Haloed Line Effect for Hidden Line Elimination," *Computer Graphics*, 13:(4), pp. 151–157, 1979.

Saito, Takafumi and Tokiichiro Takahashi, "Comprehensible Rendering of 3–D Shapes," *Computer Graphics*, 24:(4), p. 197–206, 1990.

Yessios, Chris I., "Computer Drafting of Stones, Wood, Plant and Ground Materials," *Computer Graphics* 13:(2), pp. 190–198, 1979.

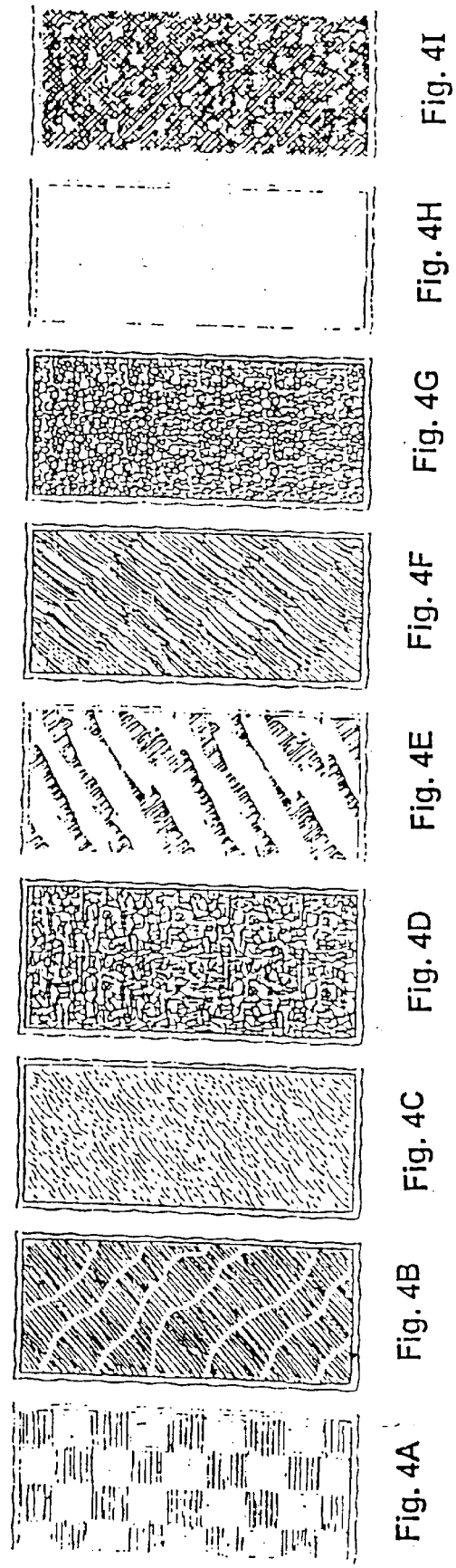

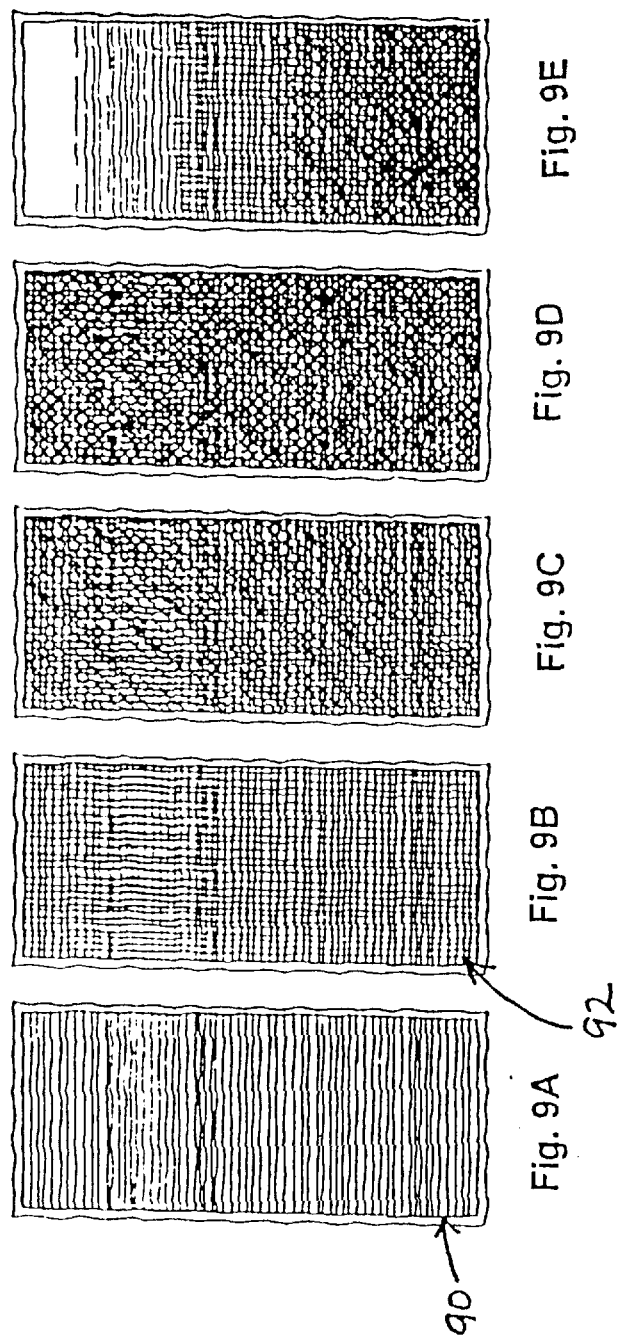

—174

—176

—178

—180

—184

METHOD AND SYSTEM FOR GENERATING GRAPHIC ILLUSTRATIONS ACCORDING TO A STROKE TEXTURE AND A TONE

STATEMENT OF GOVERNMENT INTEREST

This invention was made with government support under Grant Nos. CCR-8957323 and CCR-9357790, awarded by the National Science Foundation. The government has certain rights in the invention.

TECHNICAL FIELD

The present invention relates to a method and apparatus for generating illustrations, and more particularly to a method and apparatus for producing pen-and-ink style illustrations.

BACKGROUND OF THE INVENTION

Most of the research in computer graphics rendering over the last twenty years has been devoted to the problem of creating images of physical scenes with ever-increasing complexity and realism.

However, the computer's ability to display images of high complexity creates new problems. For example, as information becomes more complex it becomes more difficult to communicate in a comprehensible and effective manner. In order to communicate truly complex information effectively, some form of visual abstraction is required. This type of abstraction has been studied most comprehensively in the fields of graphic design and traditional illustration.

The area of non-photorealistic rendering, including techniques such as illustration, has received relatively little attention in the computer graphics community. Some research has been done by Seligmann and Feiner, as discussed in "Automated Generation of Intent-Based 3D Illustration," *Computer Graphics* 25(4):123–132, 1991. The publication describes methods for automatically constructing illustrations to achieve a particular communicative goal. However, the system discussed by Seligmann and Feiner is primarily concerned with the high-level goal of composing the best model for communicating a particular intent and does not concern itself with the specific details of rendering a model once it is built.

Digital painting is concerned with the production of non-photorealistic imagery, which it solves by emulating traditional artists' tools. A few publications on digital painting describe an approach of creating higher-level interactive tools that can produce the same results as their predecessors. For example, brushes that lay down textured paint are described in Lewis, "Texture Synthesis for Digital Painting," *Computer Graphics* 18(3):245–252, 1984. Further, Haeberli, "Paint By Numbers: Abstract Image Representations," *Computer Graphics* 24(4):207–214, 1990, shows how scanned or rendered image information can be used as a starting point for "painting by numbers," and Haeberli and Segal, "Texture Mapping as a Fundamental Drawing Primitive," *Proceedings of 4th Annual EUROGRAPHICS Workshop on Rendering*, pp. 259–266, Paris, June 1993 (École Normale Supérieure), shows the use of hardware and texture-mapping for painting and also mentions 3-D halftoning effects. However, these articles fall short of describing interactive tools that will increase a user's speed, while still allowing the user to easily create effective and attractive illustrations.

Related work has also been done in the field of creating black and white illustrations, generally for engineering or graphical design work. The earliest such system was Sutherland, "Sketchpad: A Man-Machine Graphics Communication System," in *Proceedings of the Spring Joint Computer Conference*, pp. 329–346, 1963. Further, Gangnet et al., "Incremental Computation of Planar Maps," *Computer Graphics* 23(3):345–354, 1989, shows the use of planar decomposition to manipulate and clip geometric objects. In Pavlidis, "An Automatic Beautifier for Drawings and Illustrations", *Computer Graphics* 19(3):225–230, 1985, a method for "cleaning up" schematic drawings by removing hand-drawn irregularities is described.

In Yessios, "Computer Drafting of Stones, Wood, Plant and Ground Materials," *Computer Graphics* 13(2)190–198, 1979, a prototype "computer drafting" system for common materials used in architectural designs, including stones, wood, plant and ground materials is described. The system attempts to provide a warmer, hand-drawn appearance as opposed to a mechanical one. Further, in Miyata, "A Method of Generating Stone Wall Patterns," *Computer Graphics* 24(4):387–394, 1990, an algorithm for automatically generating stone wall patterns is discussed.

A discussion on how a line could be "haloed" automatically to give the appearance of one line passing through another is given by Appel et al., in "The Haloed Line Effect for Hidden Line Elimination," *Computer Graphics* 13(2):151–157, 1979. Further, Kamada and Kawai, "An Enhanced Treatment of Hidden Lines", *ACM Transaction on Graphics* 6(4):308–323, 1987, shows how different line attributes, such as dashed and dotted lines, can be used to give a more informative treatment of hidden lines. A further discussion on more line qualities, such as thickness, and a discussion on how the treatment of outline and surface shading can be customized by a user to create a more effective illustration is discussed by Dooley and Cohen, in "Automatic Illustration of 3D Geometric Models: Lines," *Computer Graphics* 24(2):77–82, 1990, and "Automatic Illustration of 3D Geometric Models: Surfaces," in *Proceedings of Visualization '90*, pp. 307–314, October 1990. However, this related art does not address the use of strokes to achieve both texture and tone. Further, it does not disclose how attention can be focused on more relevant features by clarifying and simplifying shapes.

Commercial products that lend a hand-drawn, non-photorealistic, appearance to graphics are available as well. For example, a product called "Squiggle," marketed by the Premisys Corporation, adds waviness and irregularities to CAD output as a post-process. Also, the Adobe "Dimensions" program allows PostScript stroke textures to be mapped onto surfaces in three dimensions.

Pen-and-ink illustrations have some particular qualities that make them especially attractive for use in generating illustrations. First, they are ideal for outlines because each individual pen-and-ink stroke can be made expressive by employing small irregularities in its path and pressure. Second, pen and ink provides a real economy of expression in representing tones and texture because the character of a few small strokes can clearly indicate the difference between textures like smooth glass and old knotted wood. Third, because of their simplicity and economy, pen-and-ink illustrations can be widely used in textbooks, repair manuals, advertising, and many other forms of printed media. Fourth, photocopying does not degrade pen-and-ink style images to the same extent as conventionally-halftoned images. Fifth, pen-and-ink illustrations can be useful in desktop publishing and in the field of laser printers, especially if the illustrations are generated and manipulated directly on a computer. Finally, pen-and-ink illustrations blend nicely with text, due to their linear quality and their use of the same ink on the same paper, making them ideal for printed publications. However, it is very difficult and time-consuming to fill tone in on a large area using a pen, and it is practically impossible to lighten a tone once it is drawn.

A thorough discussion of the principles behind pen-and-ink illustration can be found in such texts as Guptill, Rendering in Pen and Ink, Watson-Guptill Publications, New York, 1976; The Technical Pen, Watson-Guptill Publications, New York, 1992; and Lohan, Pen and Ink Techniques, Contemporary Books, Inc., Chicago, 1978.

The generation of a pen-and-ink illustration requires three basic operations: strokes, tone and texture, and outline.

In classical pen-and-ink illustration, a "stroke" is produced by placing the point, or "nib," of a pen in contact with paper, and allowing the nib to trace out a path. The thickness of the stroke can be varied by varying the pressure on the nib.

There are some basic principles of stroke-drawing. First, too thin a stroke can give a washed-out appearance, while too coarse a stroke can detract from delicate details. Second, it is frequently necessary to vary the pen position, with the nib sometimes turning as the stroke is drawn. Third, strokes must look natural, not mechanical. Even-weight line drawings appear lifeless; instead, the thickness of a line should vary along its length. Finally, wavy lines are a good way to indicate that a drawing is schematic and not yet completely resolved.

The terms "value" and "tone" are used interchangeably to refer to the amount of visible light reflected toward an observer from a point on a surface. In traditional pen-and-ink illustration, it is impossible to portray the value of each surface precisely; instead, combinations of strokes are used to create an overall impression of the desired tone.

The tone achieved by a combination of strokes is a function of the ratio of black ink to white paper over a given region of an illustration. If the character of the strokes is varied, then the same strokes that are used to achieve a particular "tone" can also be used simultaneously to indicate the "texture" of the subject being rendered. This dual role of individual strokes to convey both tone and texture is part of the economy of pen-and-ink illustration.

Because texture in an illustration is the collective result of many pen strokes, each individual stroke is not critical and need not be drawn precisely. Indeed, a certain amount of irregularity in each stroke is desirable to keep the resulting texture from appearing too rigid or mechanical.

The most commonly used textures include hatching, formed by roughly parallel lines; cross-hatching, formed by overlapped hatching in several directions; and stippling, formed by small dots or very short lines. Textures can also be wavy, scribbly, or geometric and can appear hard or soft, mechanical or organic.

The perceived grey level or tone in an illustration depends largely on how dense the strokes are in a region. Although grey-level ramps can be achieved by judiciously increasing stroke density, fine-art illustrations typically emphasize contrast between adjacent regions, and often employ a very limited number of distinct grey levels.

Some important principles apply to the drawing of tones and textures with pen-and-ink strokes. First, tones should be created from lines of roughly equal weight and spacing. Second, it is not necessary to depict each individual tone accurately; however, presenting the correct arrangement of tones among adjacent regions is essential. Third, to disambiguate objects, it is sometimes important to "force tone" by enhancing contrast or inventing shadows. Fourth, the character of strokes is important for conveying texture, geometry, and lighting. For example, crisp, straight lines are good for depicting "glass," horizontal surfaces should be depicted by hatching using predominantly horizontal lines, the absence of detail altogether indicates glare, a sketchy kind of line is good for "old" materials, and careful stippling is good for "new" materials. Finally, to lend economy to the illustration, it is important to utilize some form of "indication" for conveying the impression of a texture without drawing every single stroke. The method of indication should also be varied across the drawing to avoid monotony.

The use of outline is a very natural means for portraying objects. For example, most children's drawings utilize outline almost exclusively. The medium of pen and ink is ideal for creating outlines with an incredible range of expressiveness. The pen allows for outlines that change thickness to the point of sometimes disappearing altogether. In addition, the character of the outline stroke can be a very powerful indicator of texture.

Shapes in an illustration can be defined by outline strokes. These strokes are exceptional in that they may be long and individually significant. Often the outline is left implicit by a change in tone or texture. The choice of whether or not to use outlines is largely an aesthetic one, made by the artist, and used to achieve a particular effect. For example, explicit outlines are typically used for hard surfaces, while implied outlines generally convey a softer or more organic object.

Outline strokes are used not only for the contours of an object, but also for delineating the essentials of its interior. For example, in an illustration of a leaf, the veins are typically rendered in outline, in addition to the contour.

Different styles of rendering use various combinations of outline and tone. Moreover, there exists an entire spectrum between outline and tone in illustrations, because, as the use of outline begins to become more complex, an illustration with outline takes on more and more aspects of an illustration with tone.

There are some classical principles for drawing expressive outlines. First, the quality of an outline stroke is important for conveying texture. Crisp straight lines are good for hard objects, while a greater variety of line quality is better for soft objects. Second, thick outlines are used to suggest shadows, or to bring one object or part of an object forward in the scene. Third, thick line junctions are useful to suggest darkness where objects overlap and to add "snappiness" to the illustration. Fourth, outlines should become "haloed" and fade away where one object passes behind another object. Finally, outlines must be introduced where tones are omitted to convey shape.

In summary, pen-and-ink illustrations have some attractive qualities that would allow a computer or similar device to display complex images in a simple but effective way. However, traditional methods of rendering an image cannot be applied to pen-and-ink illustrations since, among other reasons, a single operation of producing strokes must provide both tone and texture to the resulting image in pen-and-ink illustrations.

SUMMARY OF THE INVENTION

The present invention provides an easy and efficient way to produce pen-and-ink illustrations by using stroke textures which are composed of a plurality of strokes that provide both tone and texture in the illustration.

According to one aspect, the present invention involves a method of creating stroke textures. First, the dimensions of an area in the illustration that the stroke texture will occupy is input. This can be done with a mouse, an input from another program, a pen and graphics pad, or any other type of input device. The stroke texture is assigned a type of stroke that will be used in the stroke texture. The stroke texture is also assigned a tone. The dimensions of the strokes and/or the number of the strokes to be generated in the designated area is determined by the assigned tone. This procedure is repeated for many different areas in the illustration. The stroke texture for each area is then output to form a complete pen-and-ink illustration.

In determining the nature or the number of the strokes used in the stroke texture, the amount and type of strokes used in the stroke texture can be broken up into different groups, where the simplest structure with the least strokes has the highest priority. Here, a computer will enter the highest priority group and compare its tone with the assigned tone. If the group's tone does not match the assigned value, then the computer will move to lower priority groups having more density and complexity until the desired tone is reached.

The present invention also allows the input of individual strokes, which can be either used as outlines or to do fine detail work. If outlines are input, the computer can compare tones adjacent to the outline to determine if the outline is necessary or can be deleted.

A reference image can be displayed and used as a template for the illustration or an outline can be extracted from its edges. The reference image can also be used to determine the position of stroke texture or where the stroke texture should be clipped.

Various aspects of editing the stroke texture are also available when using the present invention. For example, stroke textures can be clipped, lightened, or perturbed to give them a more natural look. Further, individual strokes can be manipulated. For example, the end points of strokes along an edge can be randomized to look less mechanical. Also, the curvature and thickness of a stroke can be varied.

A form of editing called indication can also be used in the present invention. In indication, fields are designated in the illustration which determine where the stroke textures will appear and where they will gradually fade out, allowing the simplification of the illustration.

Still other advantages of the present invention will become readily apparent to those skilled in this art from the following detailed description, wherein the preferred embodiment of the invention has been described, simply by way of illustration of the best mode contemplated of carrying out the invention. As will be realized, the invention is capable of other and different embodiments, and several details are capable of modifications in various obvious respects, all without departing from the invention. Accordingly, the drawing and descriptions are to be regarded as illustrative in nature, and not as restrictive.

BRIEF DESCRIPTION OF THE DRAWINGS

FIGS. 4A–4I show an assortment of stroke textures.

FIGS. 9A–9E show a relative increase in tone by the addition of a hatch in a new direction.

DETAILED DESCRIPTION OF THE INVENTION

Figure 1:
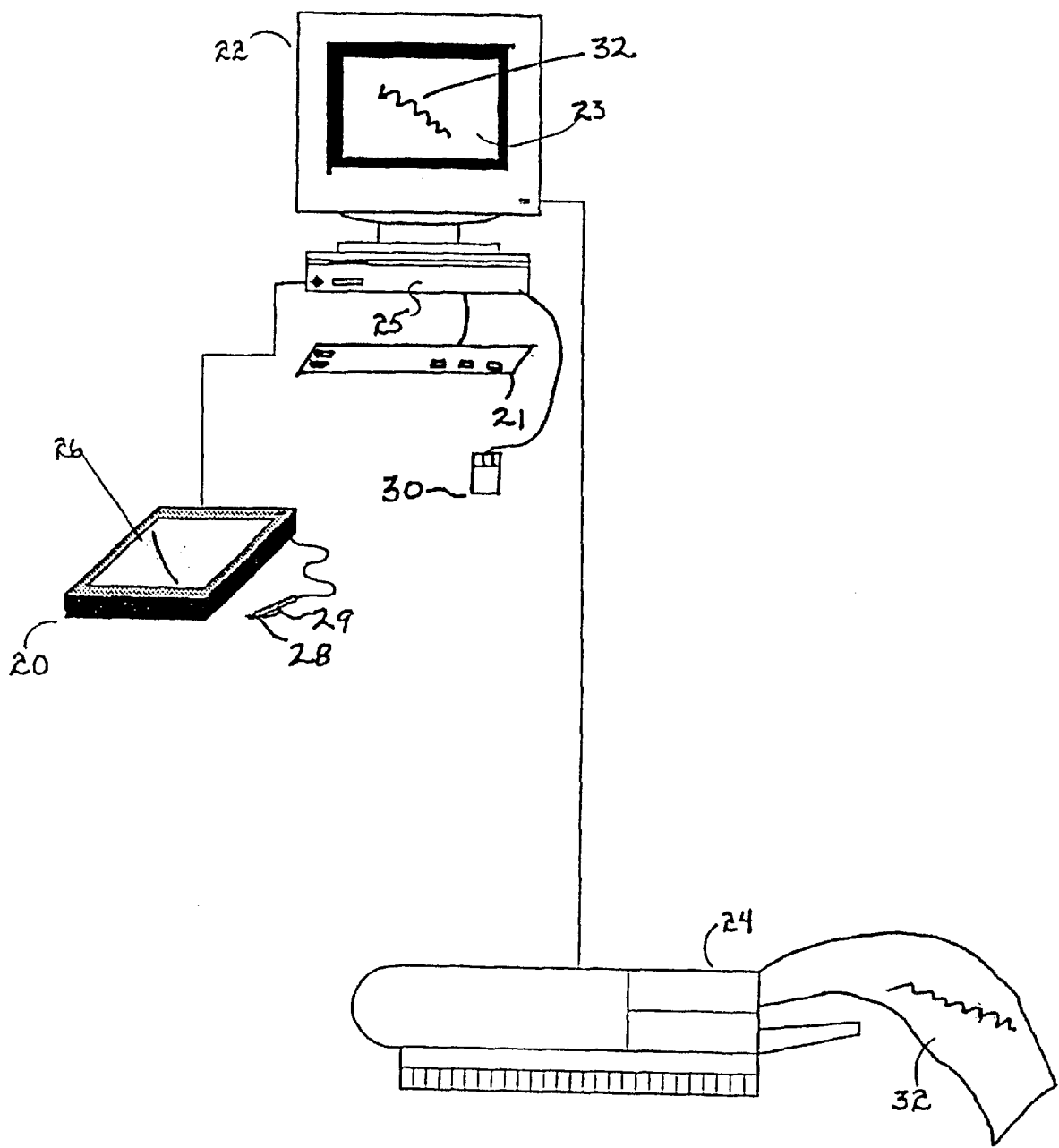
FIG. 1 shows a system for generating pen-and-ink type illustrations.

FIG. 1 shows an acceptable apparatus for carrying out the present invention. The apparatus includes an input graphics pad 20 and a computer 22. The computer 22 includes a visual output device 23 and electronic portion 25 having a CPU and a memory. The apparatus of FIG. 1 can be used to carry out the process of the various embodiments of the present invention. For example, the apparatus of FIG. 1 is useful for interactively rendering a pen-and-ink illustration by using the cumulative affects of a plurality of strokes called stroke textures to achieve texture, tone, and shape. Here, the user "paints" pen-and-ink illustrations or causes one to be rendered using textures and tones, which are drawn by a computer using individual strokes. Stroke texture may be prioritized so that the texture and complexity of an illustration increases with the tone requirements. The present invention also allows a user to draw strokes, such as outlines, that have individual significance; in addition, a user can draw individual strokes to touch up fine details of the textured work. The system also allows a user to modify a stroke character through smoothing and through the substitution of various stroke styles as well as manipulating its darkness, width, and waviness. The invention further includes various other aspects as will now be described. All these features of producing pen-and-ink illustrations can be practiced using a computer.

Figure 2A:
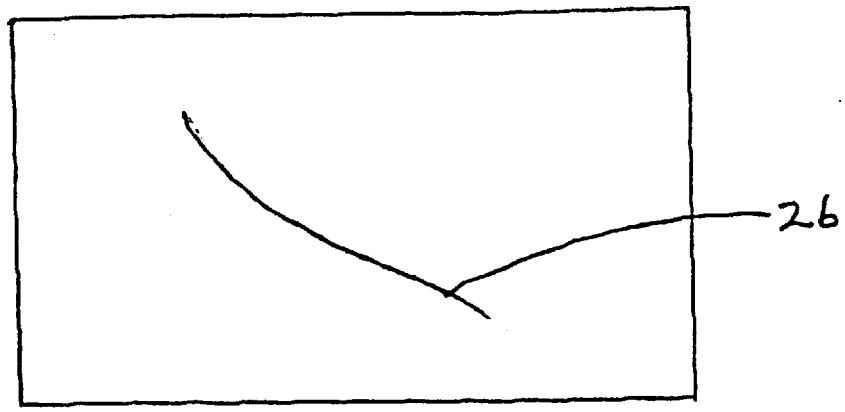
FIG. 2A shows a stroke.
Figure 2B:
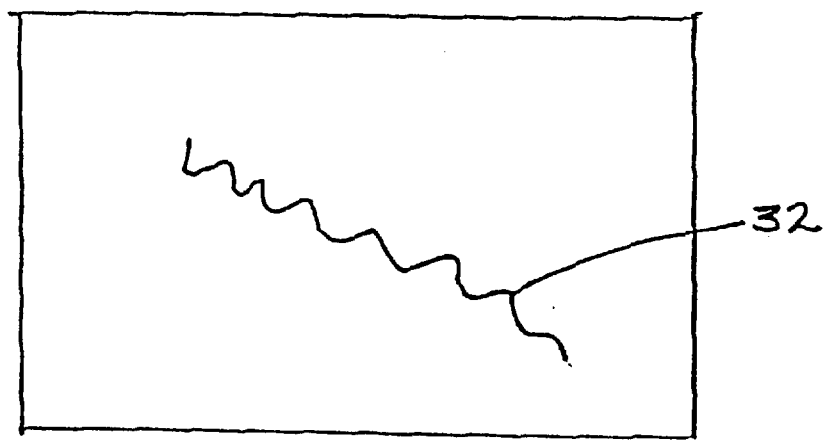
FIG. 2B shows a stroke with a waviness function added.

FIGS. 2A and 2B show the results of manipulating a stroke by adding a waviness function. Individual strokes can be drawn by hand. For example, in the present embodiment, a user can draw the figure of an individual stroke 26 by moving the nib 28 of pen 29 along the graphics pad 20 or a touch sensitive display 23, or by using a mouse 30. The stroke 26 is digitized and stored in the memory of computer 22. Once digitized, the stroke 26 can be manipulated. For example, character can be added to the stroke 26 by perturbing the path along which it travels with a waviness function. This can be accomplished by varying the pressure of the nib 28 on the pad 20 causing a change in a pressure function which in turn causes the waviness function.

When strokes are drawn by the computer 22 directly instead of with the pen 29, a C++ object named InkPen is used. InkPen is in turn composed of three objects: a Nib, a WavinessFunction, and a PressureFunction. Different "pens" can be created by assembling various combinations of these components. For example, in one embodiment, the "pen" has a circular nib of variable radius, and a sine-wave waviness function with randomly perturbed amplitude and wavelength. Pressure functions available with InkPen include a simple "broken-line" function that lifts the "pen" off the paper with some randomness, and a random sine wave function that creates strokes of varying thickness. Although this implementation does not allow for all the generality of a real pen-and-ink stroke, the limited set of functions that have been implemented still allows for a fairly wide range of expressiveness.

InkPen supports methods to permit a user to select or scale the nib size, query the amount of ink deposited between two points when using a particular nib size, and draw a stroke between two points to achieve a particular darkness, in which case the darkness of the stroke will be appropriately modulated by the pressure function of the "pen".

FIG. 2B demonstrates how the original stroke 26, shown in FIG. 2A, can have character added to it with a waviness function by varying the pressure on the nib 28, to form a new stroke 32. This manipulated or edited stroke 32 is output on visual display 23 or by printing at a printer 24, as shown in FIG. 1.

When the stroke 26 is computer generated, it is digitized and represented in the memory of computer 22 by three parts; a path $P(u): [0,1] \rightarrow \mathbb{IR}^2$ (on a Cartesian plane), which gives the overall "sweep" of the stroke 26 as a function of the parameter u, a nib $N(p)$, which defines the cross-sectional "footprint" of the stroke 26, as a function of the pressure p on the nib 28, and a character function $C(u)=(C_w(u), C_p(u))$, which describes the waviness of the curve $C_w(u)$ (how the curve departs from its path) and the pressure $C_p(u)$ on the nib.

Figure 2C:
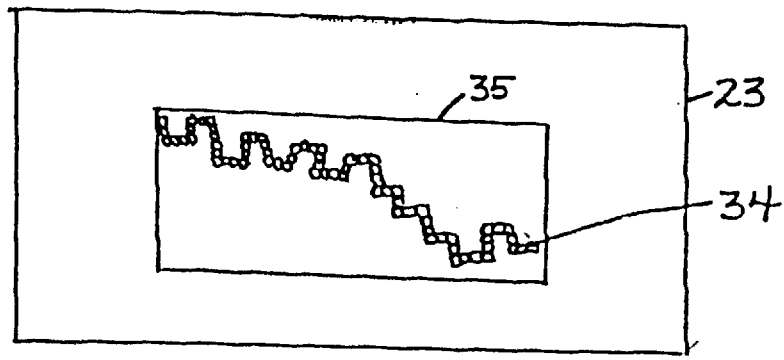
FIG. 2C shows a pixel representation of a curve.

When the stroke 26 is computer generated, it is defined as all pixels 34 in output device 23 that are displayed in the region S in block 35, as shown in FIG. 2C, where S is defined as:

$$S=(P(u)+C_w(u)) * N(C_p(u)),$$

and where * denotes the convolution of two parameterized point sets A(u) and B(u) of the Cartesian plane $\mathbb{IR}^2$. This convolution is defined as:

$$A(u) * B(u) = \bigcup_{u \in [0,1]} \{a + b | a \in A(u) \land b \in B(u)\},$$

as discussed in Guibas et al., "A Kinetic Framework for Computational Geometry," in *Proceedings of the 24th IEEE Annual Symposium on Foundations of Computer Science*, pp. 100–111, 1983.

The stroke 32 is rendered on the display 23 by scan-converting the path P(u) (after waviness is added) and stamping a copy of the nib 28, scaled by the pressure value, in place of drawing each pixel 34, as shown in FIG. 2C. A good representation of individual strokes, including their overall sweep and detail functions, can be obtained using the process discussed in Finkelstein and Salesin, "Multiresolution Curves," Proceeding at SIGGRAPH 94, Orlando, Fla., Jul. 24–29, 1994 (in *Computer Graphics*, Annual Conference Series, 1994) incorporated by reference herein. To overcome lack of smoothness in the mouse 30, unwanted detail can be removed using the multiresolution smoothing described in the above publication. Further, prestored "artistic" irregularities can be introduced by manipulating the detail using multiresolution editing discussed in the same publication. Each entry in pixels 34, shown in FIG. 2C, can be used as a control point of an interpolating spline, which is subject to multiresolution analysis and can have its detail edited or replaced. The resulting curve is scan-converted to recover the contiguous pixels entries required by the type of stroke being manipulated.

The rendering of pen-and-ink illustrations that require more than a few simple strokes cannot be performed in a traditional manner since there are some fundamental differences between such illustrations and photorealistic imagery. For example, in traditional graphics, the rendering of texture and tone are completely independent. Texture is typically defined as a set of images that affect the shading parameters assigned to each surface of an object, and tone is produced by dimming or brightening the rendered shades, while leaving the texture invariant. For pen-and-ink illustration, the very same strokes that produce tone must also be used to convey texture. Thus, tone and texture must become more tightly linked in a system for producing this type of imagery. Further, for pen-and-ink illustration, the 2-D aspects of a particular projection used are every bit as essential as the 3-D information, used in traditional graphics, for creating a proper rendering. The necessary 2-D information takes a number of forms. For example, the size of the projected areas must be used to compute the proper stroke density, in order to accommodate the dual nature of strokes described above. In addition, the 2-D adjacencies of the projected geometry must also be used, since outlining depends on such issues as the type of junction between 2-D boundaries, and the level of contrast between tones of adjacent 2-D regions.

Figure 3A:
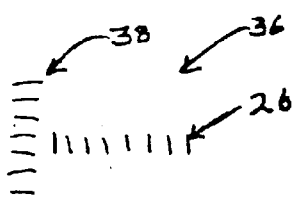
FIGS. 3A–3F show the sample stroke textures of random strokes, parallel lines, stippling, a set of bricks, a set of shingles, and grass, respectively.

To solve the problem of the dual nature of strokes, the "stroke texture" 38 has been developed, as shown in the pen-and-ink illustration 36, in FIG. 3A. The stroke texture 38 is comprised of at least one stroke 26 and usually of a plurality of similar type strokes. The stroke texture 38 simultaneously provides both tone and texture in the illustration. As with the stroke 26, the stroke texture 38 is input and stored in the memory of the computer 22. Entry of this information can be performed by any suitable means, such as the digital graphics pad 20 or touch sensitive display 23 and nib 28, keyboard 21, mouse 30, by direct creation on computer 22 using the CPU, by an output of a graphics program such as a computer aided design (CAD) program, by being input electronically from a network, or any other suitable method.

Figure 3B:
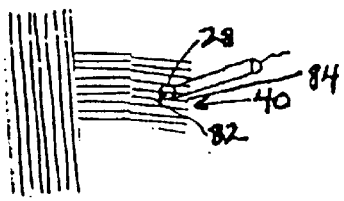
Figure 3C:
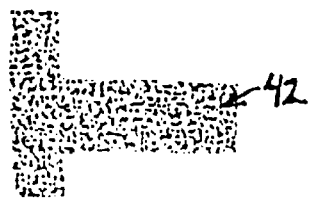
Figure 3D:
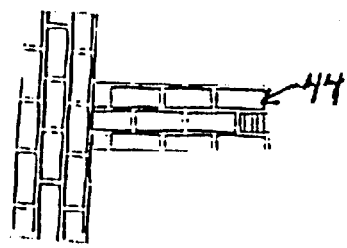
Figure 3E:
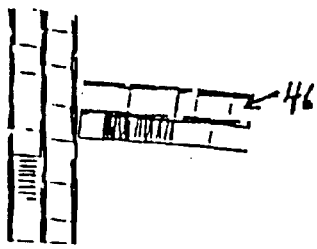
Figure 3F:
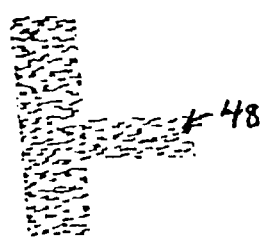

The strokes 26 forming the stroke texture 38 can be arranged such that when the geometry of the illustration is input by a graphics program or created directly by the computer, coupled with an assignment of texture for each surface, a pattern of strokes is formed. This pattern can comprise simply a series of parallel lines 40, as shown in FIG. 3B, stippling 42, as shown in FIG. 3C, a set of bricks 44, as shown in FIG. 3D, a set of shingling 46, as shown in FIG. 3E, grass 48, as shown in FIG. 3F, or any other type of pattern or combination of patterns which could be utilized to form the pen-and-ink illustration 36. Some of these other types of stroke texture are shown in FIGS. 4A–4I.

Figure 5A:
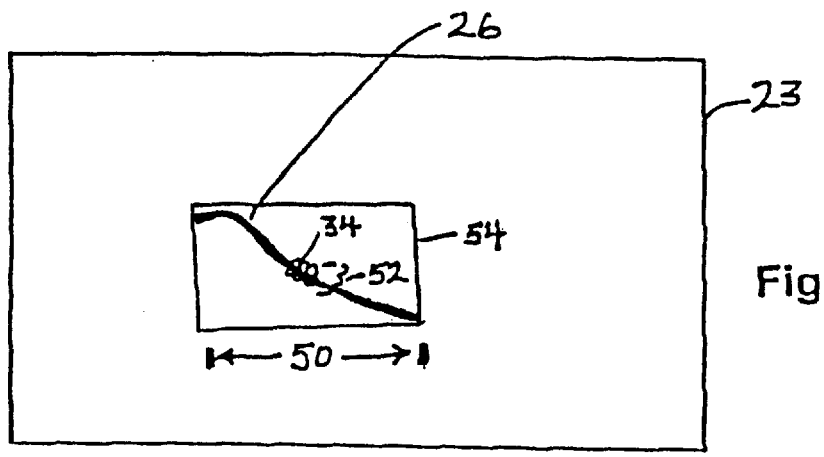
FIGS. 5A–5C show representations of a single stroke.

The two basic data structures used by the illustration system of the present embodiment to produce the stroke texture 38 are a stroke and a stroke database. Each stroke 26, as shown in FIG. 5A, includes the following fields: pixels, which is an arbitrary-size array of (x,y) pixel coordinate pairs; length 50, which is the size of the pixels array; width 52, which is the width of the stroke 26, in pixels 34; box 54, which is the rectangular bounding box of the stroke's pixels; an id (identification), which is the texture from which the stroke was derived; and priority, which is the ranking of a stroke, if in a prioritized texture, as will be discussed below. The entries of the pixel array contiguously trace the path of the stroke, and x and y never change by more than ±1 from one entry to the next.

Figure 5B:
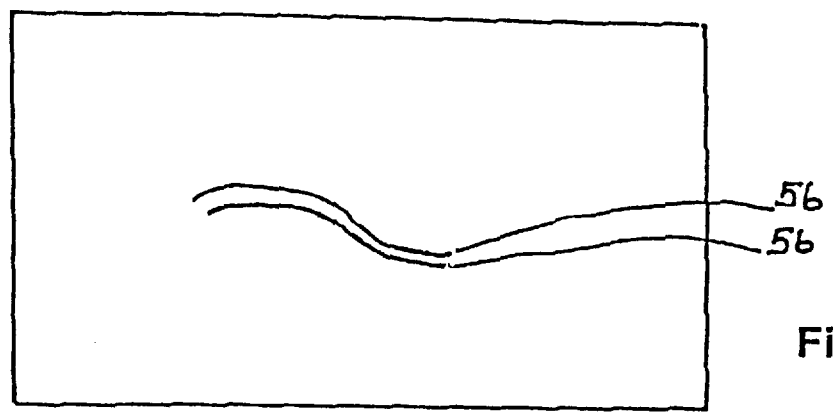
Figure 5C:
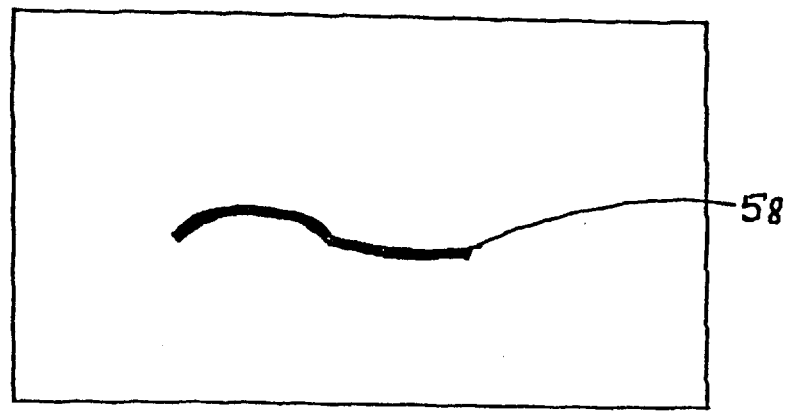

The operations supported by the stroke data structure in this illustration system include: testing to see if a stroke 26 intersects a given rectangular region, circular region, or other stroke; decreasing length 50 by trimming entries off the ends of pixels 34; merging two contiguous strokes 56, as shown in FIG. 5B, into a single stroke 58, as shown in FIG. 5C; and returning the point in the stroke that is closest to a given pixel.

Figure 5E:
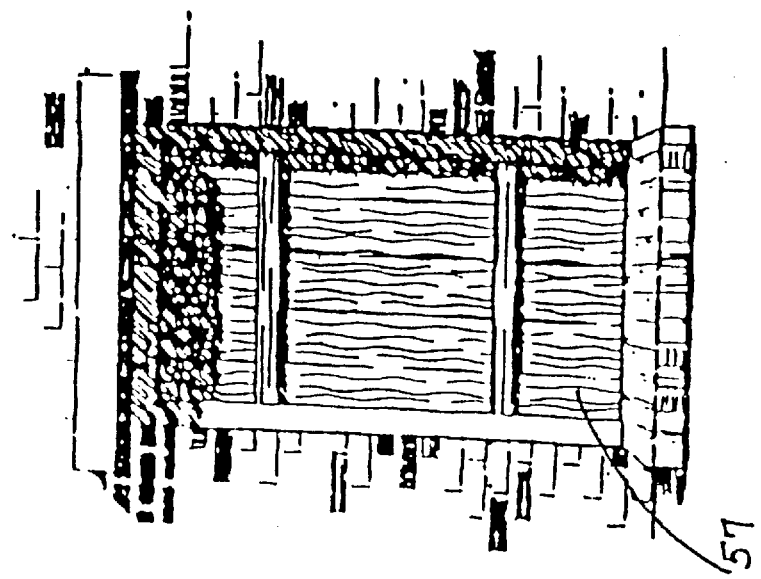
FIGS. 5D and 5E show the addition of waviness to lines in a figure.
Figure 5D:
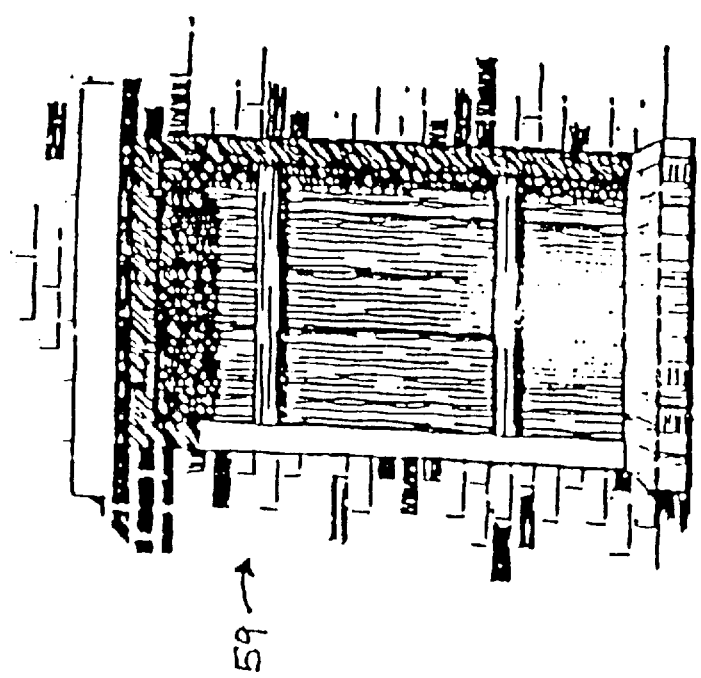

A stroke database maintains a collection of stroke data structure instances. It is important that the stroke database operations, such as addition and deletion of strokes, and its various queries be quick enough to allow painting and editing at interactive speed. For example, strokes from the database can be used to draw images 59, as shown in FIG. 5D. Further, operations can be used to edit various portions of the image, such as adding waviness to lines 57, which represent wood, as shown in FIG. 5E.

Figure 6A:
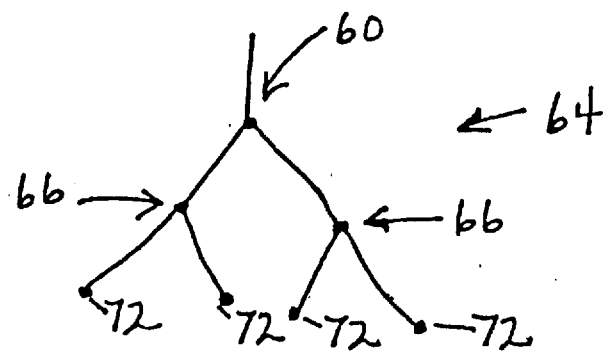
FIG. 6A shows a k-D tree.
Figure 6B:
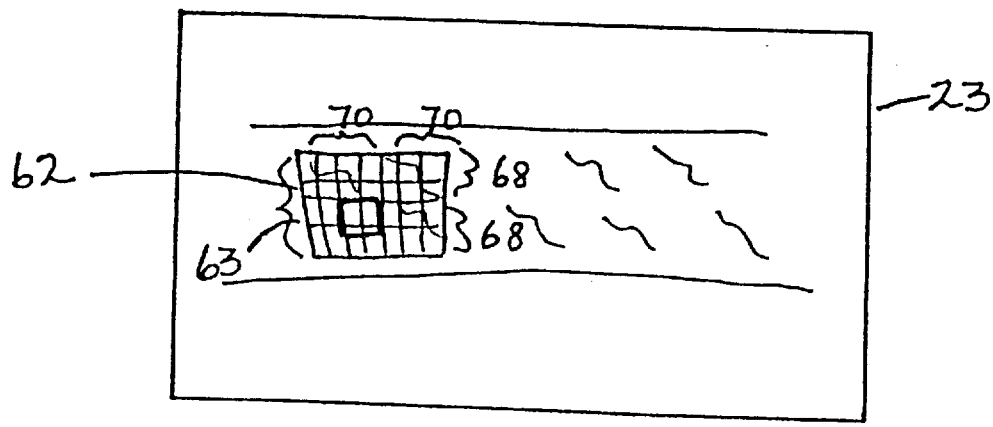
FIG. 6B shows the partitioning of a region of pixels.

A stroke database, such as the main stroke database, is implemented using a modified k-D tree, see Sedgewick, *Algorithms*, Addison-Wesley Publishing Company, Reading, Mass., 1983. Each node 60 of the tree 64, as shown in FIG. 6A, corresponds to a region of the image such as a region or group of pixels 62 in the display 23, as shown in FIG. 6B. The children 66 of the node 60 partition the region or group of pixels 62. The partition is either horizontal, i.e., partitioned into areas 68, or vertical 66, i.e., partitioned into areas 70, and is chosen so as to distribute as evenly as possible the strokes of a region between the two children, etc. Each leaf node 72 contains a list of the strokes that intersect its region. For performance purposes, a limit of ten strokes per leaf node 72 and a minimum size of 5×5 pixels per leaf node 72 are maintained (with the area restriction having precedence).

In the modified k-D tree 64, a given stroke 26 may be referenced by several leaves 72 since a stroke can cross partitions of the tree 64. The structure allows all strokes 26 that may overlap a specified region 63 to be found quickly by the usual recursion along the limbs of the tree 64 that include the region 63. Minor extra bookkeeping is required when iterating through the strokes 26 in the leaves 72 to ensure that a stroke 26 is not visited multiple times.

The queries supported by a stroke database include: finding all strokes 26 within a given rectangular or circular region 63; finding all strokes that overlap a given stroke; and finding the stroke nearest a given pixel 62. Each query may specify criteria such as a particular id value. These queries allow the illustration system to perform operations such as deleting a stroke and updating the output device 23 as follows: first, the system finds the stroke nearest the cursor on the output device 23; next, it deletes the stroke from the database and erases it from the output device 23; finally, the system finds all strokes that overlap the deleted stroke and redraws them.

The illustration system of the present embodiment maintains several global data objects to support the interactive illustration processes. The main stroke database and image bitmap maintain an illustration in a dual representation: a stroke database maintains the collection of stroke instances that make up the illustration; and an image bitmap allows the system to quickly determine if a pixel has been drawn by one or more strokes. When storing to disk, only the stroke database needs to be saved; the image bitmap can be recreated by traversing the database and drawing all the strokes.

Figure 6C:
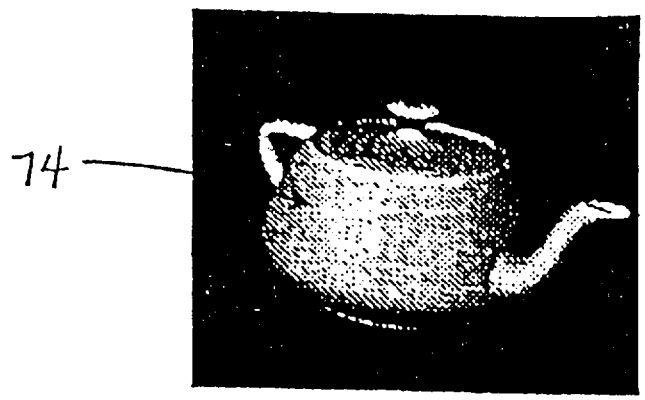
FIGS. 6C and 6D show the use of a reference figure for outlining or clipping.

Other global data objects of the present illustration system are the clip-edge database and clip-edge bitmap. To allow fast clipping of drawn strokes to outline edges, the system maintains a global bitmap into which all clipping edges are drawn. The clip edges can come from edge detection of a reference image 74, such as shown in FIG. 6C, or from freehand drawing. To allow the user to activate and deactivate edges, the edges are stored as stroke instances in the clip-edge database, which is a stroke database.

Additional global data objects are stored stroke textures. The system loads stored stroke textures on demand from a library on disk. A stored texture is defined as a rectangular region with a toroidal wrap-around, so that the texture can seamlessly tile an illustration plane. Each stored stroke texture is maintained in the system as a stroke database. For a prioritized stored stroke texture, each stroke has an associated priority value. The stroke database of a stored stroke texture is queried but is not modified when the texture is used.

Figure 6D:
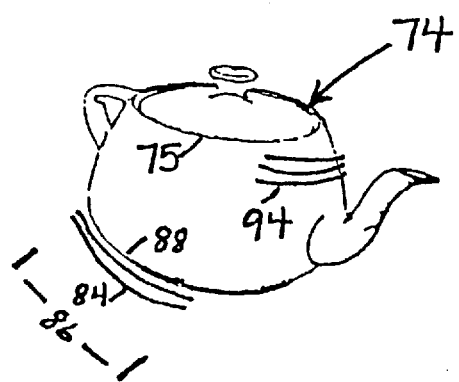

A further global data object of the system is the stored reference image 74 in memory thereby allowing quick pixel-by-pixel tone reference and stenciling. A scanned, rendered, or digitally painted continuous-tone reference image 74 can be underlaid "beneath" the illustration being drawn so that it shows only faintly on the display 23, as shown in FIG. 6C. This reference image 74 can be used in several ways; for example, the reference image 74 may be used as a visual reference for an artist, or as a tone reference for painting, in which case the texture darkness of the reference image 74 matches that of the image being created. The reference image 74 may also be used as a source image from which edges 75 are extracted and used for outlining and clipping as shown in FIG. 6D. In this application, the user can select edges corresponding to versions of the image at various resolutions. A further use of the reference image 74 is as a progenitor of stencils. In this case, the user can interactively define stencils by specifying ranges of intensities in the reference image 74, and strokes are drawn only where the tonal value of the reference image 74 is within the specified ranges. Finally, the reference images 74 may be used as a reference for determining stroke and texture orientation. Textures that follow the reference gradient, as discussed above, can be particularly useful for conveying curved surfaces.

The present invention's extensive support for reference images makes the illustration system a particularly effective tool for interactive digital halftoning. However, it does not provide automatic halftoning, it is up to the user to choose which stroke textures to apply, where to apply them, and how dark to make them, based on the user's intent and aesthetic sense for the final illustration.

Unlike the image bitmap of the illustration, the reference image 74 is an 8-bit greyscale. When a reference image is loaded from disk, the detected edges in the image are added to a clip-edge database and bitmap. A Canny edge extractor (Canny, "A Computational Approach to Edge Detection," in Rangachar Kasturi and Ramesh C. Jain, eds., *Computer Vision: Principles*, pp. 112–131) can be used to detect edges at several image resolutions. This potentially time-consuming processing is only done the first time a given reference image is used; the resulting edges are saved on disk along with the image, so that they can be loaded quickly in the future.

The process of "painting" strokes and stroke textures with a nib 28 or mouse 30, as performed by the computer 22, is outlined in the following pseudocode:

```
Paint:
    for each brush position P
        while S ← GenerateCandidateStroke(P)
            ClipStroke(S)
            if TestStrokeTone(S) then
                DrawStroke(S)
            end if
        end while
    end for
```

Figure 7:
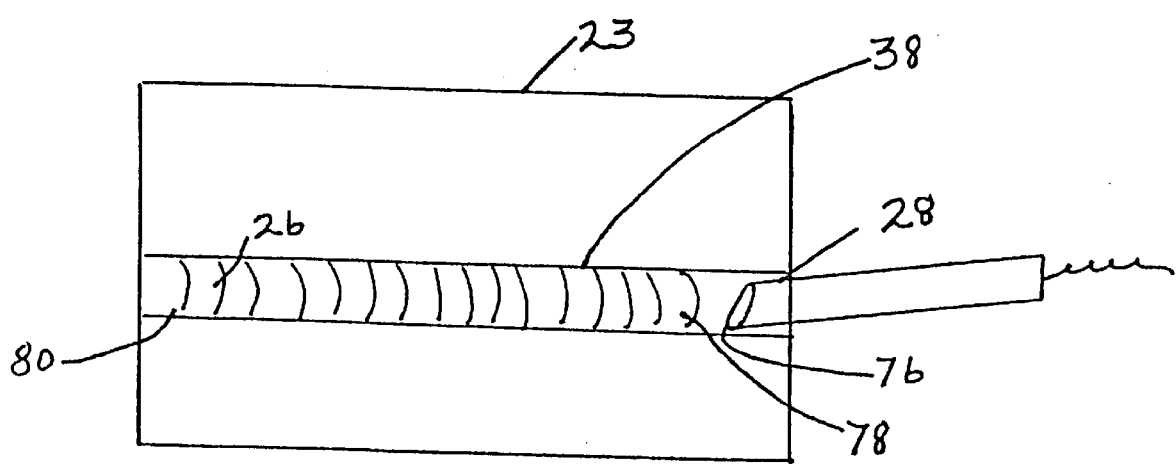
FIG. 7 shows the "painting" of a stroke texture.
Figures 8A, 8B, 8C, 8D, 8E:
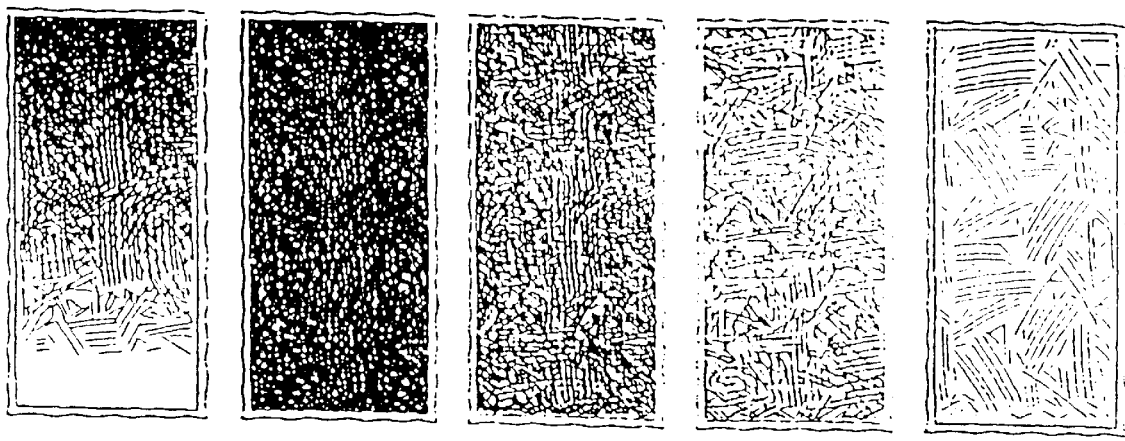
FIGS. 8A–8E show the use of strokes to achieve successively darker tones.

In the above pseudocode, when a user paints an area 80, as shown in FIG. 7, with the nib 28 of a pen 29, the step of "GenerateCandidateStroke(P)," at each position P, such as position 76, will try to draw a stroke. Each invocation of "GenerateCandidateStroke" returns a next stroke 78 from a set of candidates. The next stroke 78 returned may be generated dynamically based on the success of the previous strokes. The generation of candidate strokes depends on the stroke texture 38 selected by the user. This is because the drawing of a stroke texture at a given darkness is a matter of choosing a subset from a collection of strokes that has enough strokes to reach the desired tone. Thus, the darker the tone desired, the more strokes 26 in an area of the stroke texture 38, as shown in FIGS. 8A–8E.

For painting simple stroke textures such as stippling 42, as shown in FIG. 3C, the choice of strokes to draw for a given tonality is not critical. In these cases, the computer 22 simply selects strokes from the selected texture in a random sequence, generating candidate strokes and testing the tonal effect of candidate strokes. Candidate strokes that pass the tests are drawn, and those that fail are discarded. For example, when stippling, there is only a single candidate: a stipple dot at a random location under the nib 28.

On the other hand, when the illustration system paints a straight hatching stroke texture 40, as shown in FIG. 3B, the system tests candidate strokes by trying a sequence of line segments with decreasing length, until a segment that passes is drawn or a minimum length is reached. The midpoint 82 of each stroke 84 is a random location under the nib 28, and the direction and initial length are specified by the user. The direction of stroke 84 may be fixed or aligned relative to the gradient of the reference image 74, as shown in FIG. 6D.

The user may request a small randomization of the direction and length. The user may also specify that only full-length strokes be used, in which case if the initial candidate is not drawn, no further strokes are attempted. Each candidate stroke is a perturbed line segment, generated by the following pseudocode:

PerturbedLineSegment($x_1$, $y_1$, $x_2$, $y_2$, $\alpha$, $\omega$, c):

; ($x_1$,$y_1$) and ($x_2$,$y_2$) are the endpoints of the line segment.
; a is the magnitude and $\omega$ the base frequency of waviness.
; c is the magnitude of curviness.
; random( ) value has uniform distribution on [0,1].
; gaussian( ) value has normal distribution on [−1,1].
dx ← $x_2$ − $x_1$
dy ← $y_2$ − $y_1$ $$s \leftarrow \sqrt{dx^2 + dy^2}$$

$$\delta \leftarrow 2\pi\omega \left( 1 + \frac{1}{4} \text{gaussian}( ) \right)$$

$$\gamma \leftarrow \frac{1}{2} \delta\text{gaussian}( )$$

i ← 0, j ← 0, $\phi$ ← $2\pi$random( )
for $\alpha$ ← 0 to 1 step 1/max(|dx|, |dy|)
    ;perturb line with sine waviness and quarter-wave curve.

$$b \leftarrow \text{asin}(\phi)/s + c \left( \cos\left( \frac{\pi}{2} \alpha - \frac{\pi}{4} \right) - 1 \right)$$

pixels[i] ← ($x_1$ + $\alpha$dx + bdy, $y_1$ + $\alpha$dy + bdx)
    ; occasionally shift the sine wave frequency.

if $j\delta > \frac{\pi}{2}$ and gaussian( ) $> \frac{1}{3}$ then $$\gamma \leftarrow \frac{1}{2} \delta\text{gaussian}( )$$

j ← 0
    end if
    ; upate for next pixel.
    $\phi$ ← $\phi$ + $\delta$ + $\gamma$
    i++, j++
end for When needed, intermediate pixels are inserted in order to maintain the contiguity requirement of the stroke.

When the illustration system paints a curved hatching stroke texture, it tests candidate strokes in a manner similar to straight hatching, where the system tries strokes of decreasing length until one is accepted. The user specifies the initial length and direction 86 relative to some reference image gradient 88, as shown in FIG. 6D. A curved stroke 84 is generated by following the image gradient as a vector field forward and backward for the given length, see Cabral and Leedom, "Imaging Vector Fields Using Line Integral Convolution", *Computer Graphics*, Annual Conference Series, pp. 263–272, 1993.

For other textures, such as the stored stroke textures, the system supports a prioritized stroke texture, where there is assigned a predefined priority for each stroke that specifies an order of use in generating and testing candidate strokes, as will be discussed in greater detail later. For example, FIGS. 9A–9E illustrate the use of hatching to produce tone, where textures having only horizontal hatches 90 are drawn for light tones, and cross-hatching strokes 92 are additionally used for darker tones.

Figure 10A:
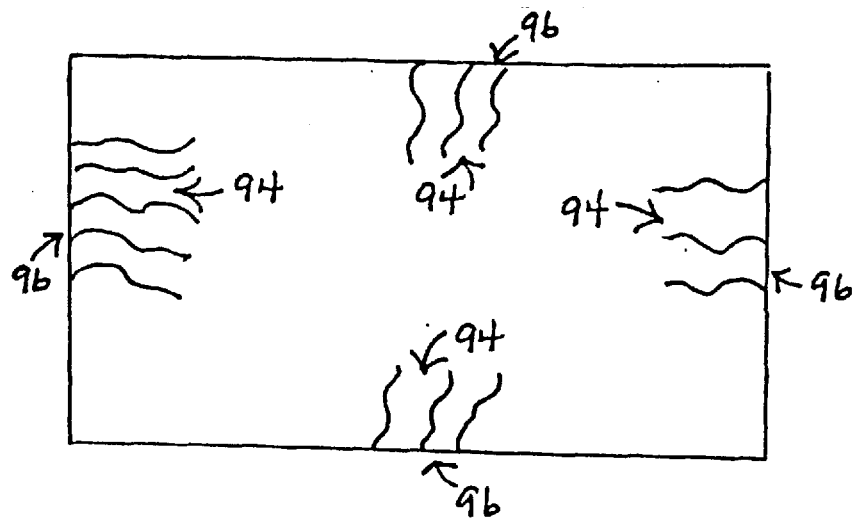
FIGS. 10A and 10B show various forms of clipping strokes.
Figure 10B:
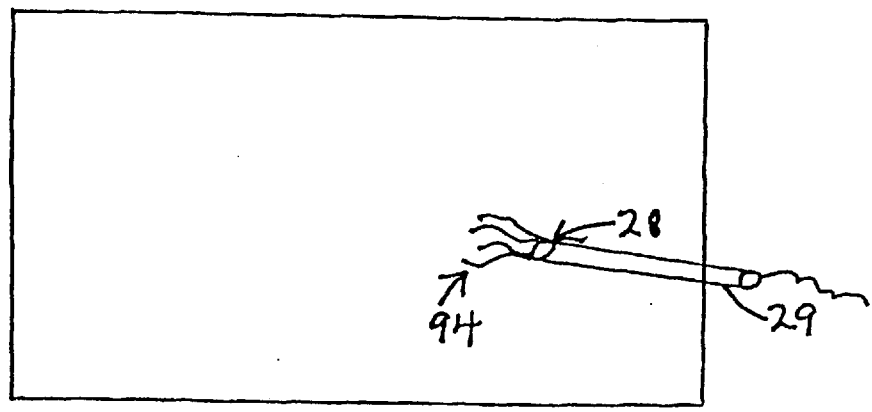
Figure 11:
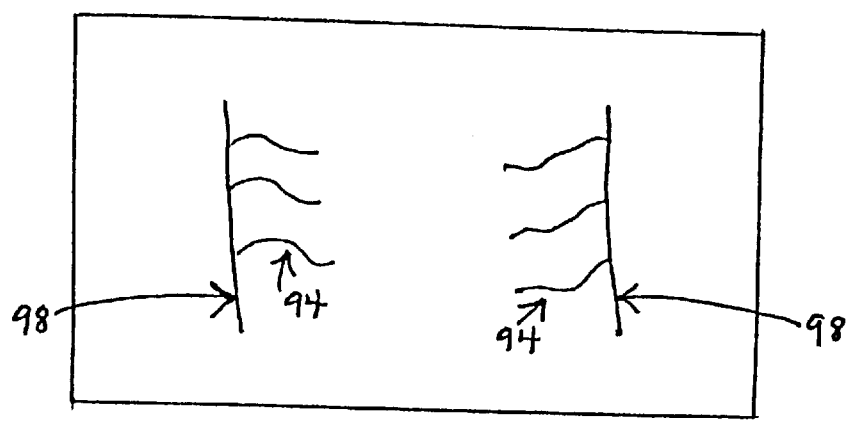
FIG. 11 shows the clipping of strokes to edges.

In the above pseudocode for painting various stroke textures, the step of ClipStrokes(S) causes the candidate stroke 94, as shown in FIG. 10A, to be subjected to a series of clipping operations. First, the stroke 94 is clipped to the bounds of the overall image in the display 23 at regions 96. Second, as shown in FIG. 10B, the stroke 94 is clipped at the nib 28 of pen 29, when the strokes are for stored stroke textures, to give the user a traditional "textured paint." Third, as shown in FIG. 11, the stroke 94 is clipped to edges 98 by tracing from the center of the stroke out to each end, examining the corresponding pixels of the global clip-edge bitmap, and stopping when an edge 98 is met. Finally, as shown in FIG. 6D, the stroke 94 can be clipped to a reference-image stencil 74 by tracing from the center of the stroke out to each end, and examining the corresponding pixels of the reference image 74. It can stop at black, white, or any of a number of user-defined ranges of image intensities.

Figures 12A, 12B, 12C:
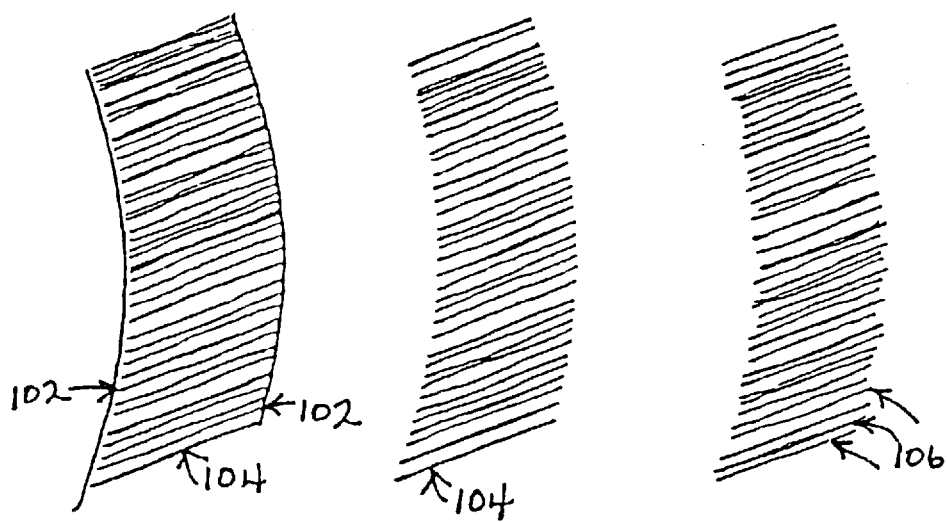
FIGS. 12A–12C show the randomization of stroke end points.

In the present embodiment, the user can specify outlines 102, as shown in FIG. 12A, which may or may not be drawn in the final illustration, but against which strokes 104 and stroke texture 106 are clipped, as shown in FIGS. 12A–C. These outlines 102 can be drawn by hand or can be taken from edges of reference images.

The clipped ends of stroke texture 106 can be made slightly ragged to make it seem more natural. The system introduces a small amount of random variation by clipping strokes 106 too soon or allowing them to spill beyond the edge of the clipping edge 102, as shown in FIGS. 12A–12C. The clipping operations return a "first" and a "last" index into the pixel array of stroke 106, but before actually trimming the stroke, these indices are perturbed up or down by a small random amount to achieve ragged clipping. The magnitude of the variation between strokes 106 can be adjusted by a user.

The clipping operations can be performed on a two-dimensional binary space partitioning (2-D BSP) tree representation of a planar map to increase their speed. For a further discussion of binary space partitioning, see Thibault and Naylor, "Set Operations on Polyhedra Using Binary Space Partitioning Trees," *Computer Graphics* 21(4):153–162, 1987.

The path of each stroke is "pushed" down the BSP tree until it reaches one or more leaf nodes of the tree, as is known in the art. Only the portions of the path that reach nodes belonging to the region being textured are rendered. Other clipping operations can also be performed. For instance, hatching shadow areas is handled by generating strokes over the entire surface and clipping them to the regions in shadow.

It is important that the strokes automatically generated by the system be irregular. Uneven strokes make an illustration look softer, more natural, and hand-drawn, whereas regular strokes introduce mechanical-looking texture. The use of irregular strokes can be compared to the introduction of randomness in image dithering. See, for a discussion on dithering, Ulichney, "Digital Halftoning," *The MIT Press*, Cambridge, 1987. However, strokes cannot be simply drawn in completely random directions, since stroke direction is one of the key elements in defining a texture. Instead, the present embodiment perturbs the strokes in a variety of small ways. For example, as shown in FIGS. 12A–12C, strokes 104 can be drawn with a slight wiggle, that is, a wave with slightly randomized frequency and phase; straight strokes can be given a slight overall curvature; and stroke length and direction can be jiggled slightly.

Figure 13:
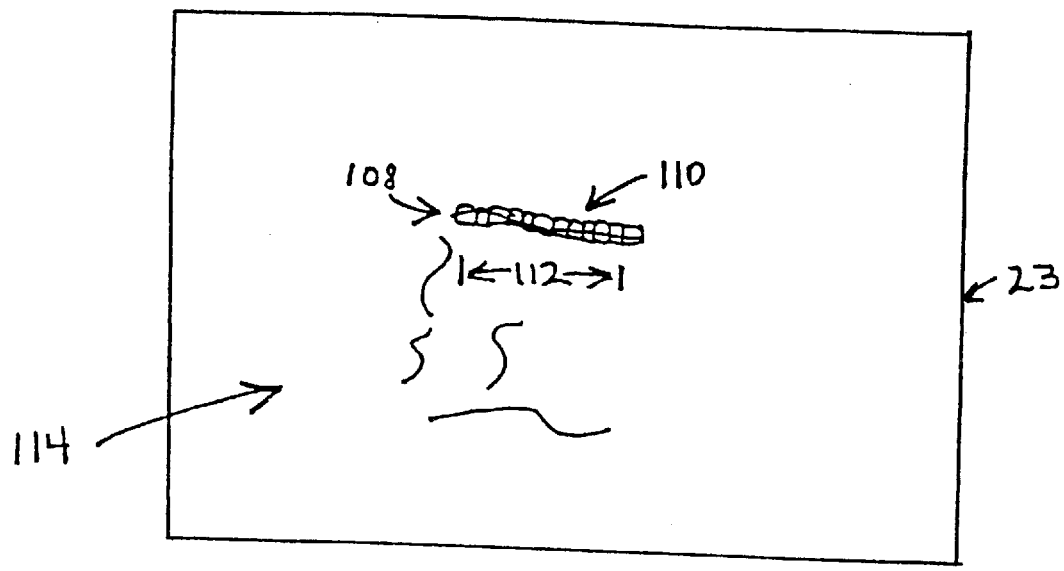
FIG. 13 shows the testing of strokes.

In the above pseudocode for painting strokes, the step of TestStrokeTone(S) performs two tests to see how some stroke S, such as stroke 108 in FIG. 13, affects the overall image. First, the pixels 110 comprising stroke 108 in the image buffer are tested: if all the pixels 110 are already drawn, the stroke has no effect on the image. Next, the effect of the stroke 108 on the image tone is determined: the stroke 108 is temporarily drawn into the image bitmap and the resulting tone is computed pixel-by-pixel along its length 112, by low-pass filtering the neighborhood of each pixel 110. Depending on the user's specification, the desired tone may be determined from a reference image's value (via similar low-pass filtering along the stroke), or may simply be a constant value. If the stroke 108 makes the image tone darker than the desired tone anywhere along its length, then it fails and will not be drawn.

Figure 14:
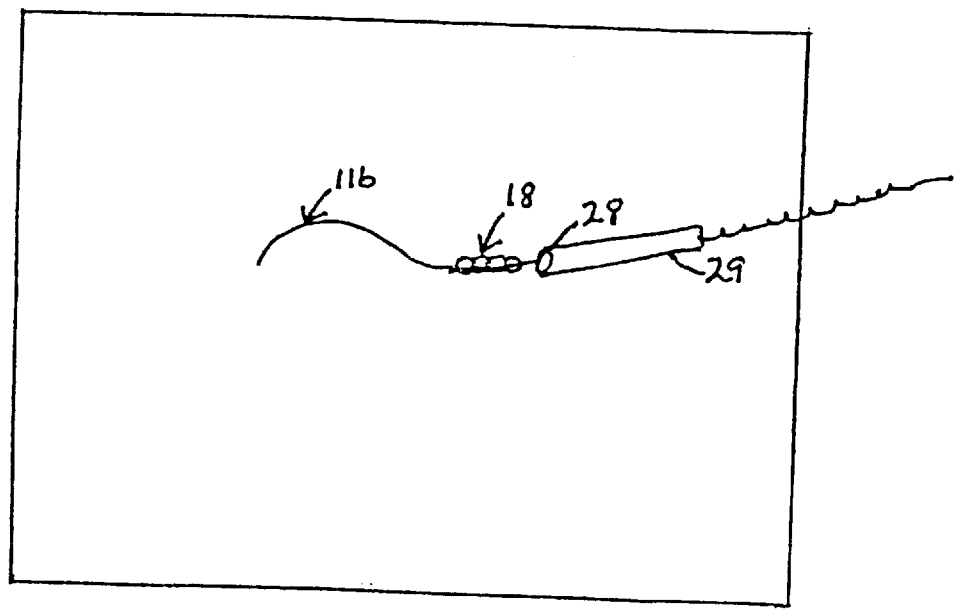
FIG. 14 shows the testing of strokes.

In the above pseudocode for painting strokes, the final step of DrawStroke(S) draws strokes 108 in an image 114, as shown in FIG. 13, its pixels 110 in the image bitmap are set, the display 23 is updated, and an instance of stroke 108 is added to the main stroke database. For stored stroke textures, the system checks to see if the new stroke 108 overlays an existing instance of the same stroke, such an occurrence could happen, for example, if the earlier stroke was clipped to the nib 28 of pen 29 and the user has now moved the nib 28 slightly. Rather than adding the new stroke 108, the previously-drawn stroke 116 is extended to include the new stroke's pixels 18 as shown in FIG. 14. Also, for a new instance of a stroke to align with a previous instance, any extra randomness should be exactly repeatable; the values for the stroke perturbations should be derived from a pseudorandom function over the illustration plane.

Instead of a user painting an illustration, the computer 22 can render the input from a computer graphics program, like a CAD program into an illustration by computing visible surfaces and shadow polygons, both of which are well known in the art. It then uses these polygons, projected to Normalized Device Coordinate (NDC) space, to build a 2-D BSP (binary space partitioned) tree and planar map, which is also well known in the art. Each visible surface of the illustration is then rendered. The texture assigned to each surface is invoked, as discussed below, to generate the strokes that convey the correct texture and tone for the surface. All the strokes are clipped to the visible portions of the surface using set operations on the 2-D BSP tree. Finally, outline strokes are drawn by extracting from the planar map all of the outline edges necessary for the illustration.

The rendering process of this embodiment, which is performed by the computer 22, is represented by the following pseudocode:

```
(BspTree, PlanarMap) ← VisibleSurfaces(M)
for each visible surface S ∈ M do
    Strokes ← Texture(S, Tone(S))
    for each stroke s ∈ Strokes do
        Render(ClippedStroke(s,BspTree))
    end for
    Render(ConstructMinimalOutline(S,PlanarMap)
end procedure
```

In the above code, (M) represents a model stored as a collection of polygons in three-space. For convenience, concave polygons and polygons with holes are decomposed into convex polygons, all of which are well known in the art. Further, (Bsp tree) represents a 2-D BSP tree and the visible polygons projected to Normalized Device Coordinates (NDC) space. Finally, (PlanarMap) represents a planar map that partitions the NDC plane into vertices, edges, and faces, according to the NDC projections of the visible polygons, and is used to generate the outline strokes of the surfaces.

The computer 22 can compute the visible surfaces using a 3-D BSP tree, as discussed in Fuchs et al., "On Visible Surface Generation by A Priori Tree Structures," *Computer Graphics* 14(3):124–133, 1980. Further, the computer 22 can compute the shadow volumes using the 3-D BSP tree, as discussed in Chin and Feiner, "Near Real-Time Shadow Generation Using BSP Trees," *Computer Graphics* 23(3) :99–106, 1989. These computations result in a set of convex polygons that can easily be ordered in depth with respect to a view point.

On the other hand, for the computer 22 to build a 2-D BSP tree, it examines the visible polygons in front-to-back order. Each polygon is first projected to NDC space, and then inserted into the 2-D BSP tree. The insertion into the 2-D BSP tree is equivalent to the set union operation described by Thibault and Naylor, "Set Operations on Polyhedra Using Binary Space Partitioning Trees," *Computer Graphics* 21(4) :153–162, 1987, except that the "in" leaf nodes, as described in the article, and well known in the art, carry an additional pointer back to the 3-D polygon from which they originate. As such, the 2-D BSP tree forms a partition of NDC space, with each cell in the partition corresponding either to a unique frontmost polygon in the 3-D scene, or to the background of the scene.

The planar map data structure is computed by computer 22 with the help of the 2-D BSP tree. Initially, a single rectangular region, representing the entire drawing surface in NDC space, is inserted into the tree. As each node of the tree is traversed, the original region is partitioned into smaller and smaller faces (i.e., of the polygons) in each branch of the tree. Faces reaching an "out" leaf node, which is well known in the art, are tagged as background faces. Faces reaching the "in" leaf node, also well known in the art, receive a pointer to the corresponding 3-D polygon in the model M. A node on the BSP tree also receives a pointer to the planar map face. Some leaf nodes in the BSP tree may never receive a matching face in the planar map because of numerical inaccuracies. During clipping, a segment that falls in a leaf node having no planar map pointer is simply discarded. Also, because such nodes correspond to extremely thin regions, no visible artifacts result.

Geometrically, the planar map and the BSP tree are redundant because they encode the same 2-D partition. However, the two data structures are amenable to different tasks. The BSP tree is efficient for clipping strokes through set operations, but does not readily allow searching among neighboring polygons. By contrast, the planar map encodes polygon adjacencies, but does not lend itself as well to clipping.

As previously mentioned, each stroke texture pattern can become prioritized by having associated with it different levels of density and configuration to achieve a different level of tone. Each of these levels of density and configuration has an associated priority, where the highest priority is given to the patterns and configurations rendering the lightest tone while the patterns rendering darker tones are given sequentially lower priority. As the overall priority level decreases, a "group" of strokes or aspect associated with that priority level is added. Thus, when rendering a prioritized stroke texture, all the strokes of highest priority are drawn first; if the rendered tone is too light, the next highest priority strokes are added, and so on, until the proper tone is achieved.

FIGS. 15A–15E demonstrate several grey scales of tone produced using different procedural prioritized stroke textures depicting "cross-hatching," "stipple," "brick," "shingle," and "grass," respectively. For each texture, the relative priorities of the strokes can be seen from the collection of strokes used to achieve a particular value of grey. The user can select the priority of each stroke texture as desired for a particular rendering or desired effect.

Prioritized stroke texture plays an important part in making texture an integral part of the illustration. The present system lets the user specify stroke textures interactively and can also support stroke textures that are computed programmatically (procedural stroke textures) or that are taken from edges extracted from scanned images.

Figures 15A, 15B, 15C, 15D, 15E:
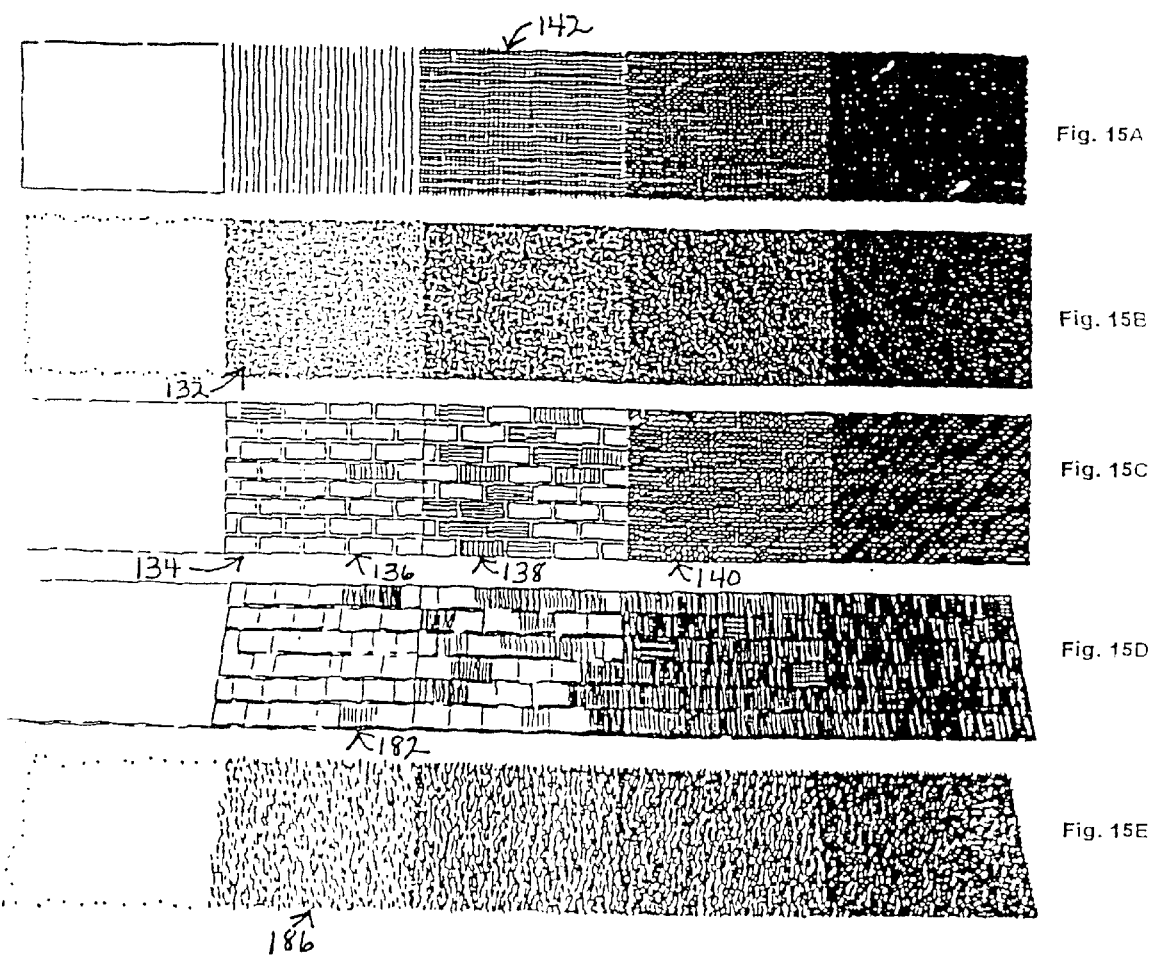
FIGS. 15A–15E show several grey scales of tone produced using different procedural prioritized strokes.

Many interesting texture effects can be computed procedurally when using manually input information parameters. The present embodiment of the system can generate three types of procedural texturing: stippling 132, as shown in FIG. 15B, i.e., randomly distributed points or short strokes, parallel hatching 134, as shown in FIG. 15A, and curved strokes, not shown. Since these are the textures programmed into a preferred embodiment of the system, they are the basic building blocks from which a user-drawn stored stroke texture is formed, such as the bricks, shown in FIG. 15C, or the shingles, shown in FIG. 15D.

To draw procedural stroke textures, the present invention simply generates appropriate candidate strokes under the region of the simulated nib 28 and tests them, as performed by the pseudocode discussed above. However, the procedural textures candidates strokes generated may exceed beyond the bounds of the simulated nib 28 of pen 29. More intricate prioritized procedural stroke textures, such as the brick, wood, or shingle textures can also be defined, for example, see Winkenbach and Salesin, "Computer-Generated Pen-and-Ink Illustration", Proceedings of SIGGRAPH 94, Orlando, Fla., Jul. 24–29, 1994 (in *Computer Graphics*, Annual Conference Series, 1994) incorporated by reference herein.

For stored stroke textures, the system queries the stroke texture's database for a list of strokes that lie under the simulated nib 28. The strokes of the resulting list are tried in priority order for prioritized textures, or random order for non-prioritized textures. A prioritized texture may be flagged as strictly prioritized, in which case if a candidate stroke fails the tone test, the remaining lower-priority strokes are not considered. Each candidate stroke is generated by translating the stored stroke's pixels to the proper tile in the image, i.e., adjusting the pixels in the stroke to NDC space when the stroke pattern is laid out on the display 23, as is known in the art. This embodiment does not add any randomness to the strokes beyond that which was used when the texture was originally defined. Tiling artifacts are typically not objectionable if the illustration feature size is smaller than the tile size, but could be alleviated through random stroke perturbations.

As stated above, the level of priority of the stroke texture can be changed by assigning different aspects (strokes) of the texture a different priority. For example, for the "brick" texture 134 shown in FIG. 15C, the outlines 136 of the individual brick elements have highest priority, the strokes 138 for shading individual bricks have medium priority, and the hatching strokes 140 that go over the entire surface have lowest priority. As another example, in the cross-hatching stroke 142, shown in FIG. 15A, the vertical strokes have priority over horizontal strokes, which have priority over the various diagonal stroke directions 143.

The first step in building tone using a stroke texture is to compute a reference tone $v \in [0=\text{white}, 1=\text{black}]$, where the well known and simple Phong model can be implemented. The next step is to produce strokes that achieve this reference tone. When using a procedural stroke texture, a set of strokes is generated that together achieve the target grey value v. For example, to achieve a tone v over an area A using a nib 28 of width w with non-overlapping strokes requires drawing strokes of total length vA/w.

To compute tone accurately, it is also important to take into account the overlap between strokes that cross each other. An uncorrelated overlap between the strokes of each non-overlapping set works well. For example, for bidirectional hatching 142, such as shown in FIG. 15A, suppose that the strokes in each hatching direction deposit a quantity of ink x on the paper. Then the total ink in the cross-hatched area is given by the sum of the ink from the strokes in each direction 2x, minus the quantity of ink that is deposited in the same place twice, which, assuming uncorrelated strokes, can be approximated by $x^2$. Thus, in order to achieve a value v, enough strokes must be used in each direction to achieve a value x that satisfies the quadratic equation $2x-x^2=v$. The correct level for each set is therefore given by $x=1-\sqrt{1-v}$. This expression is used, for example, by the "cross-hatching" texture 142, as shown in FIG. 15A, to achieve the right tone when two different directions of strokes are crossed.

Procedural prioritized stroke textures can also be used to draw more complex textures. For example, the following detailed examination of increasing the complexity to yield the "brick" texture 134, as shown in FIG. 15D, can readily be extended to other types of stroke textures.

The "brick" texture 134 builds tone out of three sets of strokes: the brick outlines 136; shading strokes 138 within the bricks; and hatching strokes 140 layered over the whole surface. Each set of strokes is associated with a different InkPen.

As an example of how the computer 22 renders the various stroke textures, the following rendering process for "brick" textures is given below by the pseudocode below:

```
procedure RenderBrickTexture(TargetTone, Polygon3D)
    Layout ← GenerateBricks(Polygon3D, BrickSizes)
    for each brick B ∈ Layout do
        DrawBrickOutline(B, TargetTone, ViewPoint, Lights)
        if the tone of B is too light then
            Shade WithinBrick(B, TargetTone)
        end if
    end for
    if the overall tone is still too light then
        HatchOver(Layout, TargetTone)
    end if
end procedure
```

The brick outlines 136 are generated from a simple layout that is computed on the fly in texture space and then projected into device space before drawing takes place.

The width of a computer generated version of the nib 28 used to draw the outline strokes of the brick is scaled according to the tone being rendered. For example, darker tones use a default nib size, while for lighter tones, the nib size is scaled down. The same nib size is used for all the bricks in order to achieve a consistent result over the entire surface. The darkness of each stroke is then adjusted so as to take shadow edge effects into account. The darkness of the strokes may be further reduced, for example, when the area of the bricks becomes smaller due to perspective foreshortening.

The tone $T_o$, created by the outline strokes 136 for a given brick, can be estimated by taking the sum of the amount of ink deposited by each outline stroke and dividing it by the area covered by the brick on the paper. If $T_o$ is not dark enough to achieve the desired tone, then the interior of the brick is shaded. The darkness of each brick is limited by a constant $T_s$. Rather than shading every brick like brick 138 shown in FIG. 15C, with the same tone $T=TargetTone-T_o$, each brick is shaded with probability $\min\{1,T/T_s\}$. Thus, there is some randomness when the brick is shaded and enough strokes are used to achieve a tone $T_s$.

If the shaded bricks still do not achieve the target tone, that is, if $T_o+T_s<TargetTone$, then additional hatching is used over the top of all the bricks.

A common problem with the figures created by existing computer drawing programs is that they do not scale well when printed at different sizes or resolutions. Enlargement is typically performed either by pixel replication, which yields ugly aliasing artifacts, or by drawing the same strokes at higher resolution, which yields thinner strokes and an overall lighter illustration. Reduction is almost always performed by scan-converting the same curves at a lower resolution, often yielding a large black mass of overlapping strokes. Printing speed is also a common problem with illustration reduction, since the same number of strokes needs to be transmitted to and rendered by the printer 24, even when a smaller number of strokes would have sufficed.

Figure 16E:
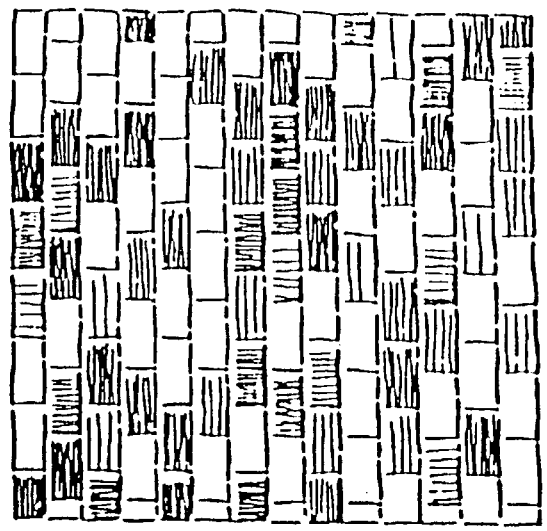
FIGS. 16A–16E show the use of different procedural levels of priority with different output size.
Figure 16D:
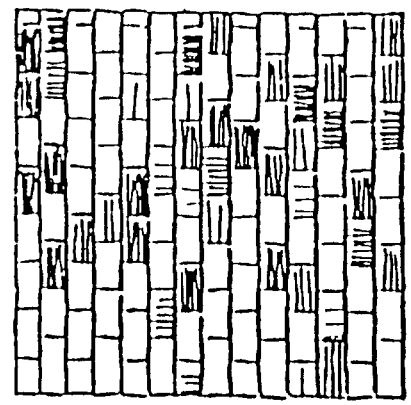
Figure 16C:
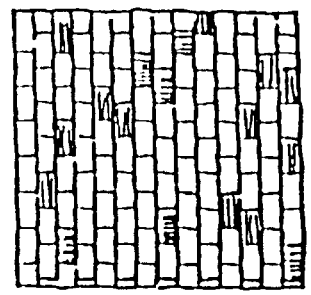
Figure 16B:
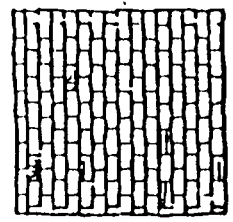
Figure 16A:
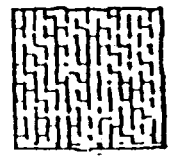

The prioritized stroke textures described here do not have the above-mentioned problems, because strokes are chosen to provide the proper texture and tone for a given illustration size and printer resolution. As shown in FIGS. 16A–16E, a smaller image such as depicted in FIG. 16A, uses fewer strokes than larger images, such as depicted in FIG. 16E, thereby improving printing efficiency.

Figure 17C:
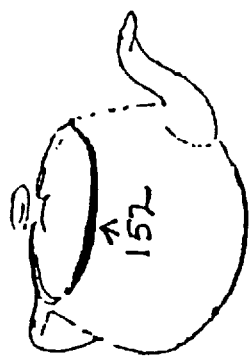
FIGS. 17A–17C show the use of multiresolution editing of an illustration.
Figure 17B:
Figure 17A:
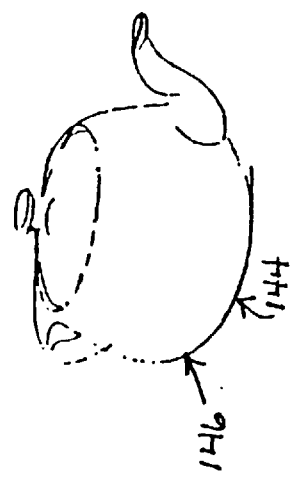

Efficiency can be improved by rendering a simplified approximate version of each stroke accurate to within one printer pixel, as discussed in Finkelstein and Salesin, "Multiresolution Curves," Proceedings of SIGGRAPH 94, Orlando, Fla., Jul. 24–29, 1994 (in *Computer Graphics*, Annual Conference Series, 1994), incorporated by reference herein. The present invention also allows the use of multiresolution curves, discussed in the above article, which enable a user to add or remove detail from strokes and edges. For example, an illustration 144 can be initially made using smooth strokes 146, which can later be adjusted in subtle or not so subtle ways, to create a wiggly or scribbly detailed edge 148, as shown in FIGS. 17A and 17B, respectively. Alternatively, detail can be removed from an edge 150 extracted from the tone reference in order to yield smoother outlines 152, as shown in FIG. 17C.

A useful tool in drafting a pen-and-ink style illustration is the principle of "indication" which lends economy to an illustration by suggesting texture without drawing every last stroke. It also makes an illustration more powerful by engaging the imagination of the viewer rather than revealing everything.

Figure 18A:
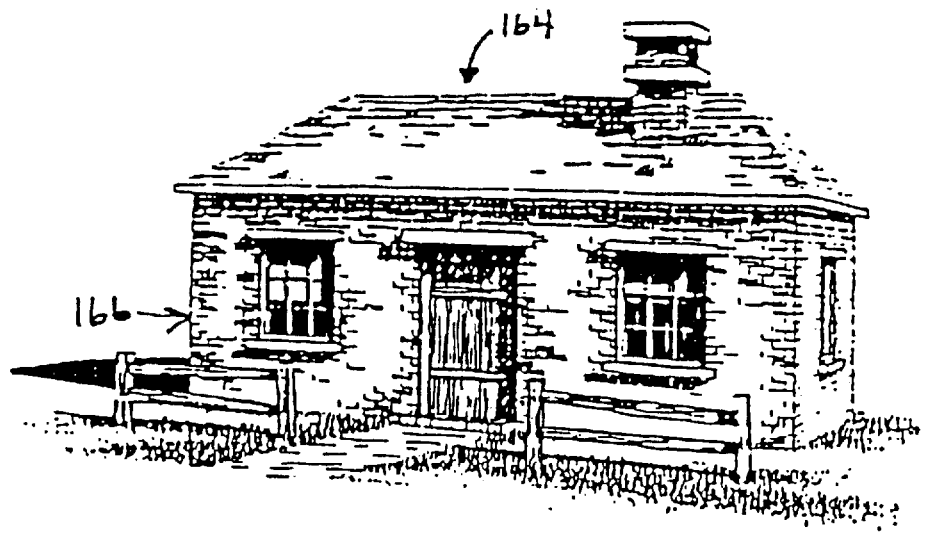
FIGS. 18A–18C show the use of indication on an illustration.

Indication, as shown in FIG. 18A, is one of the most notoriously difficult techniques for the pen-and-ink student to master. It requires putting just enough detail in just the right places, and also fading the detail out into the unornamented parts of the surface in a subtle and unobtrusive way.

Figure 18B:
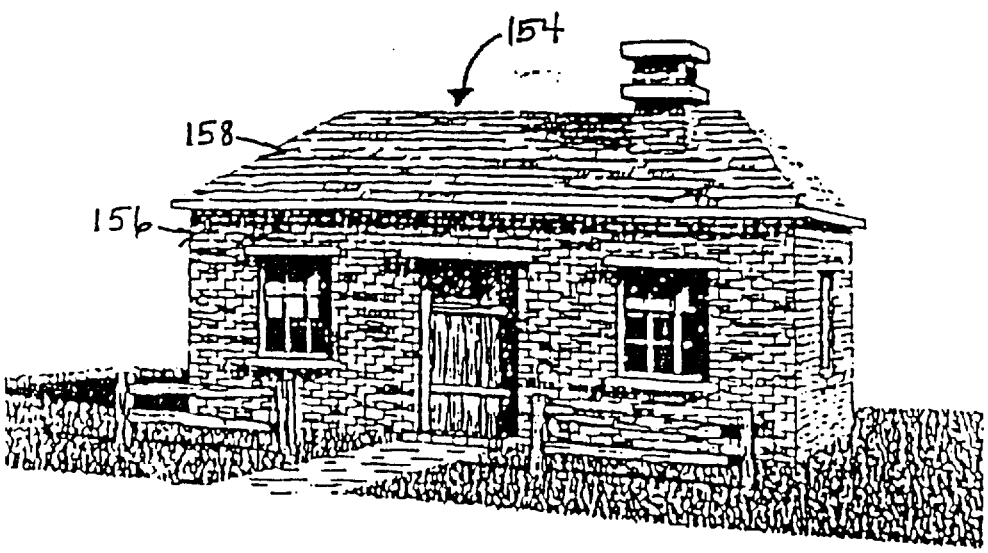
Figure 18C:
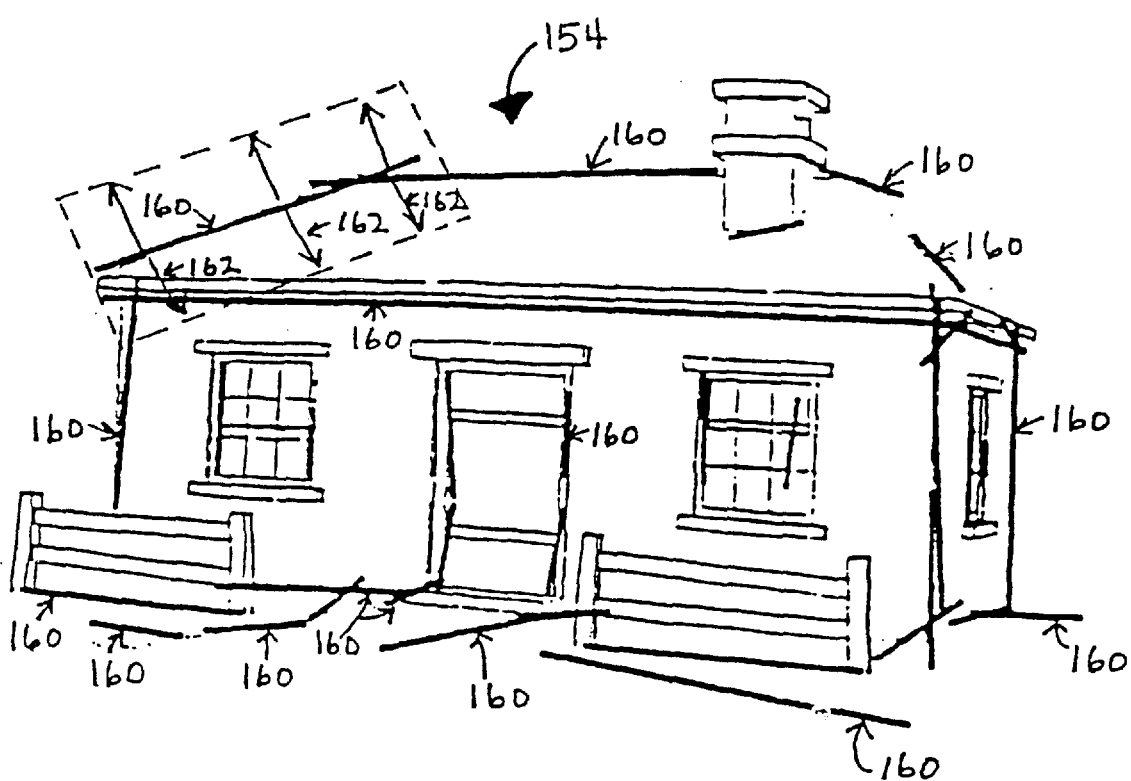

Since such tasks would be too daunting for a purely automatic method, a semi-automatic method is used, whereby the user specifies at a very high level where detail should appear in the drawing, and indication is used everywhere else. For example, in the present embodiment, if a user desires to reduce the amount of strokes used in an illustration of a house 154 having bricks 156 and shingles 158, as shown in FIG. 18B, then he would simply place detail segments 160 in the portions of the house 154 where detail is desired, as shown in FIG. 18C. Each of the segments 160 project a controllable field 162, which specifies the areas to capture or retain detail. The resulting house 164, as discussed above, is shown in FIG. 18A. The "controllable fields" 162 are discussed in the morphing paper of Beier and Neely, "Feature-Based Image Metamorphosis," *Computer Graphics* 26(2):35–42, 1992. Each segment is projected and attached to the texture of the 3-D surface for which indication is being designed.

If the field 162 is represented by field w(x,y) and the detail segment 160 that generates the field 162 is represented by detail segment l, then the field w(x,y) is generated at a point (xy) in texture space according to:

$$w(x,y)=(a+b * \text{distance}((x,y),l))^{-c},$$

where a, b, and c are non-negative constants that can be used to change the effect of the field. When several detail segments are present, the field at a point (xy) can be defined to be that of the closest segment. So as not to create patterns that are too regular, the field w(x,y) is perturbed by a small random value, resulting in edges 166 of FIG. 18A. Textures such as "bricks" and "shingles" evaluate the strength of the field of indication at the center of each brick or shingle element. The set of strokes for that element is generated only if the indication field is above some preset threshold.

Figure 19:
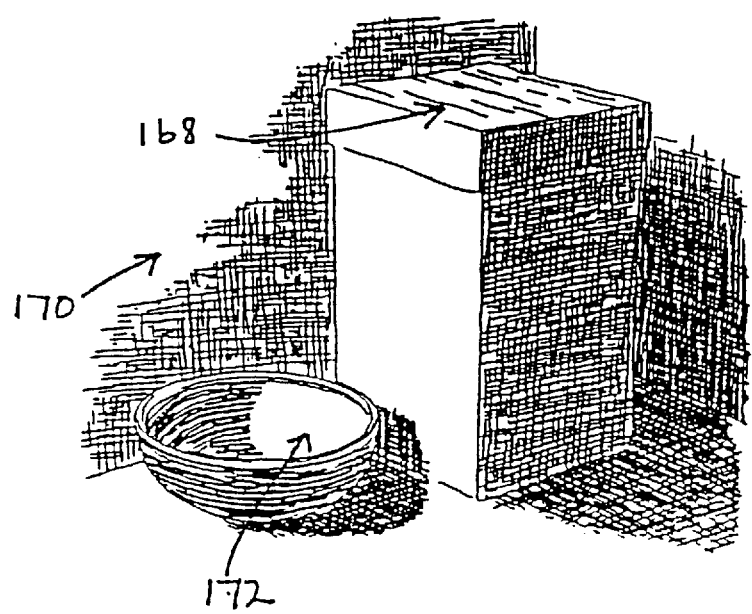
FIG. 19 shows the use of selective lightening.

Another useful tool in drafting a pen-and-ink illustration is the editing operation of selectively lightening the illustration. Rather than simply erasing all strokes under the nib 28, the "lighten" editing operation incrementally removes strokes. Thus, a textured region that is too dark can be made lighter without destroying the integrity of the texture, instilling pen-and-ink with qualities of a subtractive medium. For example, in FIG. 19, the mottled effects on the top of box 168, on the background 110, and the bowl 172 were created by painting a cross-hatch texture to a uniform darkness over the entire display 23, then slightly lightening in a few places within the display 23 over areas directly touched by the nib 28 of the pen 29.

Outlining plays a significant role in pen-and-ink illustration, and is usually found in two varieties. The first type of outline is the "boundary outline," which surrounds visible polygons of an image. This type of an outline must be drawn in a way that takes into account both the textures of the surrounded regions, and the adjacency information, which is stored in a planar map. The outlines of visible surfaces are extracted by traversing the set of edges stored in the planar map while testing the tones of adjacent faces, and is easily accomplished by searching in the planar map. The second type of outline is the "interior outline," which is used within polygons to suggest shadow directions or to give view-dependent accents to the stroke texture.

Figure 20A:
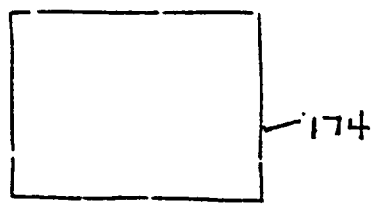
FIGS. 20A–20E show various boundary outlines.
Figure 20B:
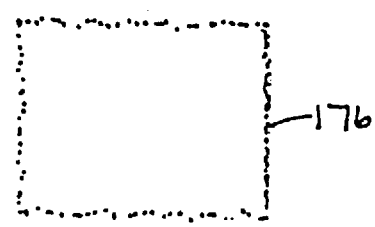
Figure 20C:
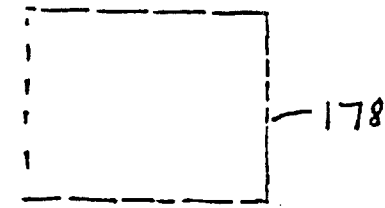
Figure 20D:
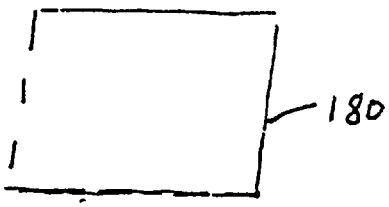
Figure 20E:
Figure 21A:
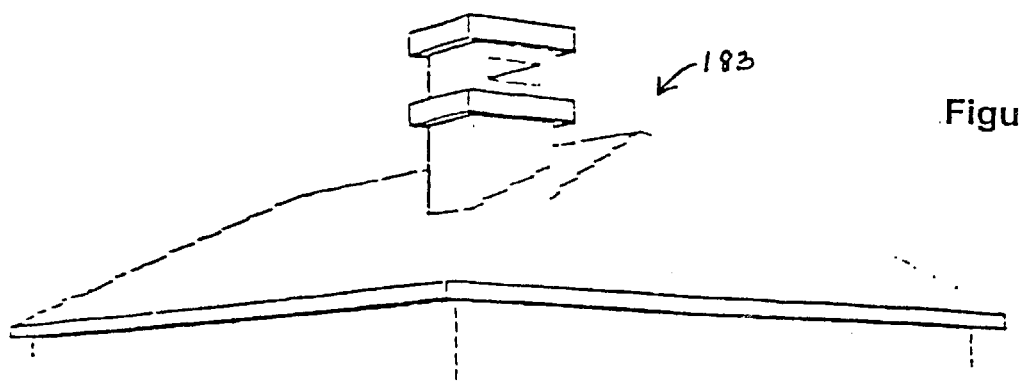
FIGS. 21A and 21B show the selective use of boundary outlines.
Figure 21B:

Each type of stroke texture has associated with it a boundary outline texture, which is used whenever the outline of a polygon is textured with the same type of stroke. The boundary outline textures for some different textures shown in FIGS. 15A–15E are demonstrated in the white squares of FIGS. 20A–20E. The boundary outline texture 174 for the line texture 140 is shown in FIG. 20A, the outline texture 176 for the stipple texture 132 is shown in FIG. 20B, the outline texture 178 for the bricks texture 138 is shown in FIG. 20C, the outline texture 180 for the shingles texture 182 is shown in FIG. 20D, and the outline texture 184 for the grass texture 186 is shown in FIG. 20E. As a further example, FIGS. 21A and 21B show one illustration 183 with just boundary outline texture and one illustration 185 with boundary outline and interior texture.

Figure 21C:
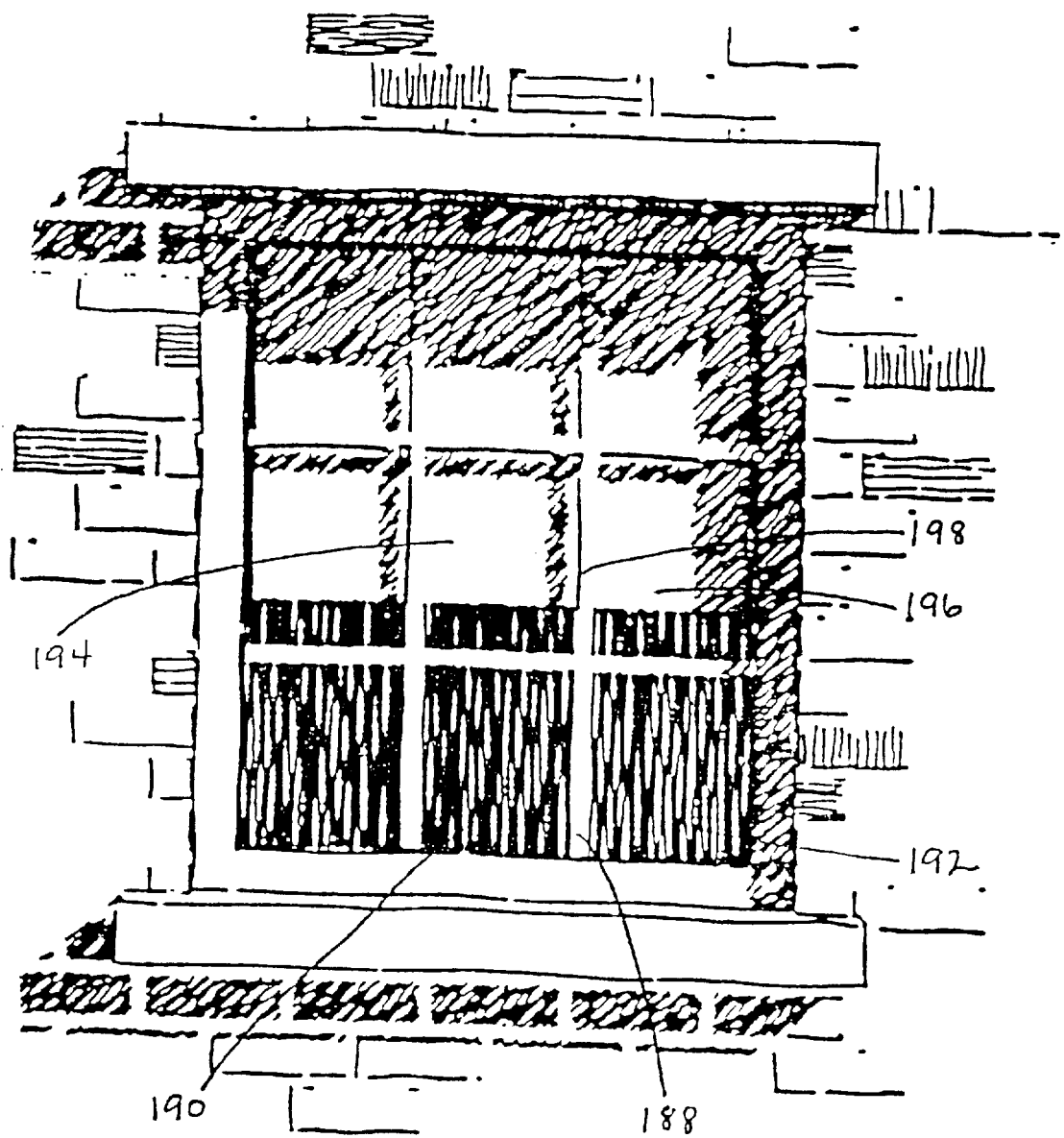
FIG. 21C shows the minimization of outline edges.

Outline edges can be minimized by rendering them only when the tones on either side of the edge are very similar, and when the edges themselves are not directly illuminated by a light source. For example, as shown in FIG. 21C, if an edge 188 is shared by two faces 190 and 192 of a planar subdivision that are easily distinguishable, then no outline is drawn. However, if two faces 194 and 196 are not sufficiently different, then the rendering algorithm of the present invention draws a boundary outline 198. In this sense, the use of boundary outline strokes is minimized. When a boundary outline stroke is drawn, it must be rendered according to the boundary outline texture for only one of the two faces 194 or 196, and the face of the planar subdivision that represents a polygon closer to the viewer should be chosen. Thus, an outline is omitted in the presence of sharp changes in tone, and added in the absence of tone changes.

Figure 22A:
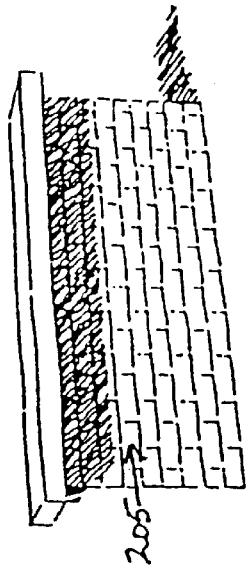
FIGS. 22A–22C show the use of outlines to depict the direction of a light source.
Figure 22B:
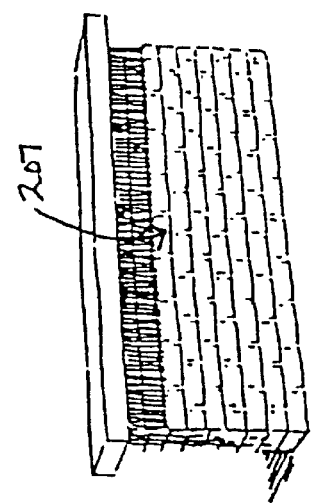
Figure 22C:
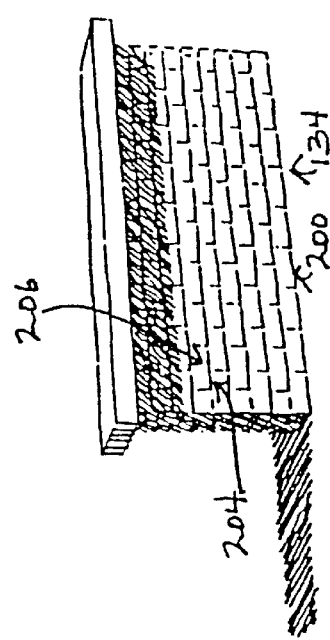

"Accenting" or "thickening" outline edges is a technique that provides subtle but important cues about the three-dimensional aspects of an illustrated scene. In the present embodiment, as shown in FIGS. 22A–22C, the interior outlines of each brick 200 in the "brick" stroke texture 134 are drawn according to their relationship with the direction of a light source 202, where the brick edges 204 cast shadows, which are rendered with thickened edges, while illuminated brick edges 206 are not drawn at all. In FIG. 22A, light source 202 is illuminating from the upper right causing the top and right brick edges 206 to be illuminated edges and the lower and left edges 204 to cast shadows, in FIG. 22B, only the top edge 207 is illuminated, and in FIG. 22C the top and left edges 205 are illuminated.

Figure 23A:
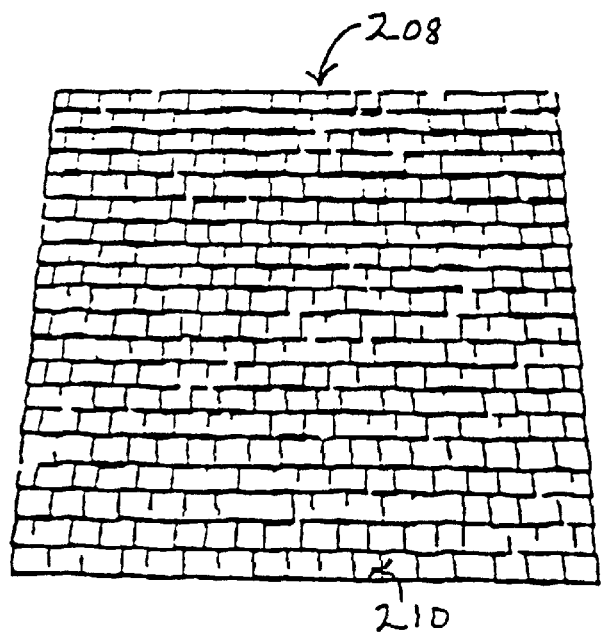
FIGS. 23A and 23B show the use of outlines to depict the angle of view.
Figure 23B:
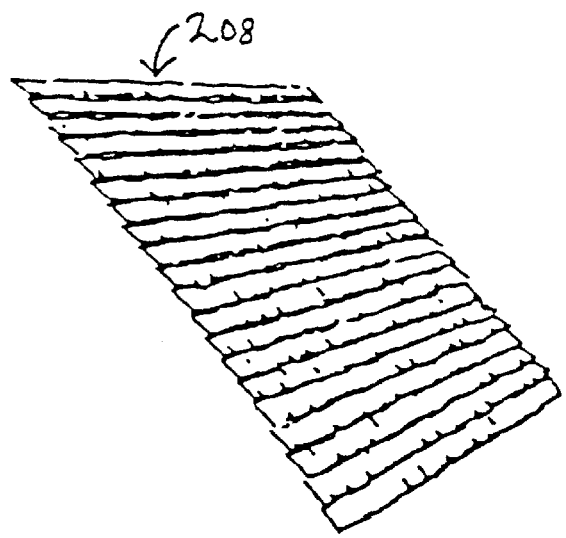

In addition to the light source direction, the viewing direction is another important parameter that should be taken into account when drawing outline strokes. For example, a stroke texture of roof shingles 208, shown in FIG. 23A, when viewed from above, has almost all its edges 210 between individual shingles clearly visible. However, when viewed from more to the side, the shingles 208 tend to blend together, and the vertical edges 210 begin to disappear, leaving the horizontal edges predominant as shown in FIG. 23B. To implement this effect, each stroke texture is outfitted with a very simplified "anisotropic bidirectional reflectance distribution function" (BRDF), which describes its outline features in terms of both the lighting and viewing directions.

The present embodiment creates illustrations by selecting texture while inputting it to its designated position. The texture can be selected to comprise a single stroke or a plurality of strokes. A plurality of strokes can be retrieved from a library of user-defined textures. Further, the strokes may be modified or edited to smooth the strokes or add waviness. The strokes can be input either with a mouse or with a tablet or any other input means and can use the outlines of background reference figures. Further, strokes can be added or removed until a desired tonality is achieved.

The present embodiment also allows an automated rendering system to incorporate principles from traditional illustration that can be used for communicating visual information effectively. This includes information present for driving an ordinary graphics pipeline and is in many respects also sufficient for achieving important non-photorealistic effects. The present invention also has introduced the concept of a "prioritized stroke texture," which is a general framework for creating textures from strokes, and providing a methodology for building procedural versions of these textures. Finally, the present invention allows a form of resolution-dependent rendering, in which the choice of strokes used in an illustration is appropriately tied to the resolution of the target medium.

While the foregoing has been a discussion of a specific embodiment of the present invention, those skilled in the art will appreciate that numerous modifications to the disclosed embodiment may be made without departing from the spirit and scope of the invention. Accordingly, the invention is limited only to the following claims.

We claim:

1. A method for using a computer to produce an image simulating a hand-drawn pen and ink illustration, comprising the steps of:
   (a) enabling a user to select an area comprising a portion of the image, said portion being less than the entire image;
   (b) enabling the user to specify one of a plurality of different stroke textures for the area in the image, said stroke textures comprising a plurality of simulated pen and ink strokes that convey a visual impression of both a tone and a texture, each of the plurality of stroke textures including random variations in the simulated pen and ink strokes to emulate corresponding hand-drawn strokes;
   (c) automatically applying the stroke texture specified by the user to the area in the image, the area limiting the extent of the stroke texture;
   (d) repeating steps (a) through (c) for each of a plurality of other areas in the image; and
   (e) rendering the image with the stroke textures specified for each of the areas by the user, to simulate a hand-drawn pen and ink illustration.

2. The method of claim 1, further comprising the steps of:
   (a) providing a reference image for use in producing a corresponding simulated hand-drawn pen and ink illustration; and
   (b) extracting edges from the reference image for use by the user in indicating the plurality of areas in the image and for use in clipping the stroke textures applied to the areas.

3. The method of claim 2, wherein the step of providing the reference image comprises one of the steps of scanning, rendering, and digitally painting the reference image.

4. The method of claim 2, wherein the reference image includes portions having a varying intensity, further comprising the step of enabling the user to specify a range of intensities in the reference image so that a specified stroke texture is only applied to the image in areas corresponding to the portions of the reference image where the intensity is within the specified range.

5. The method of claim 2, further comprising the steps of automatically determining gradients of intensity in the reference image; and employing the gradients to automatically determine a curve that is followed by the stroke texture specified for an area in the image, so as to visually indicate a curved surface for said area in the image when rendered.

6. The method of claim 2, wherein the reference image provides an indication of a tone in an area of the reference image, said indication being used by the computer to automatically apply strokes to achieve a corresponding tone in a corresponding area of the image when rendered.

7. The method of claim 1, further comprising the step of saving edges that define the areas in a database for subsequent use if the image is later rendered again.

8. A method for enabling a user providing an input to a computer to interactively create an image simulating a hand-drawn pen and ink illustration, comprising the steps of:
   (a) enabling a user to indicate an area comprising a portion of the image, said portion being less than the entire image;
   (b) enabling the user to specify a stroke texture to apply to the area, said stroke texture comprising a plurality of individual strokes that visually convey both a tone and a texture, said plurality of individual strokes having sufficient variation in appearance to simulate corresponding hand-drawn pen and ink strokes;
   (c) repeating steps (a) through (b) for each different area of the image; and
   (d) rendering the image by applying the stroke texture specified by the user to the area, said stroke texture affecting an appearance of both a texture and tone of the area, said texture being a function of a shape of the plurality of strokes, both alone and in combination, and said tone being a function of a number of strokes applied to the area, while preserving the texture.

9. The method of claim 8, wherein the stroke textures are selected by the user from a library of predefined stroke textures.

10. The method of claim 9, wherein each predefined stroke texture has a range of tones from which the user is enabled to specify a preferred tone for the stroke texture applied to the area.

11. The method of claim 8, wherein the step of specifying the stroke texture comprises the steps of enabling the user to enter one or more strokes employed to define the stroke texture; and, enabling the user to specify an extent of random variation in the strokes that comprise the stroke texture applied to the area in the image.

12. The method of claim 11, wherein the random variation is at least in part provided by automatically clipping the strokes at an edge that defines an extent of the area indicated by the user, so that some of the strokes are clipped short of the edge and others are clipped beyond the edge.

13. The method of claim 11, wherein the random variation is at least in part provided by automatically varying at least one of a thickness of the strokes and a waviness of the strokes.

14. The method of claim 8, wherein the stroke texture is generated by applying a sequence of strokes to the area, each additional stroke increasing a tone of the stroke texture, the tone being a visual impression of a relative darkness of the stroke texture applied to the area.

15. The method of claim 14, wherein different strokes comprising the stroke texture have different priorities, strokes of successively lower priority being applied to an area to increase the tone of the stroke texture in said area until a desired tone is achieved.

16. The method of claim 15, further comprising the step of enabling the user to select a specific priority of the strokes that should be used in a stroke texture applied to an area in the image, to control the tone of the area.

17. The method of claim 16, wherein based upon a priority of the strokes, the number of strokes used is varied when the image is rendered to achieve a generally constant tone, independent of at least one of a resolution and a size of the image as rendered.

18. The method of claim 8, further comprising the step of enabling the user to select a stroke texture to define an edge of an area, said edge comprising a plurality of textured strokes.

19. A method for enabling a user to employ a computer to specify where detail will appear in an image, simulating a hand-drawn pen and ink illustration, comprising the steps of:
   (a) displaying surfaces in the image;
   (b) enabling the user to apply marks to specific surfaces in the image, indicating where detail should appear in the image;
   (c) applying stroke textures selected by the user to the surfaces in the image, said stroke textures comprising a plurality of simulated pen and ink strokes that convey a visual impression of both a tone and a texture; and
   (d) rendering the image with detailed stroke textures applied to the specific surfaces, omitting the stroke textures in the image as a function of a distance from the marks, to simulate a pen and ink drawing technique used to indicate texture.

20. The method of claim 19, wherein the marks comprise detail segments that become associated with the specific surfaces in the image.

21. The method of claim 20, further comprising the step of enabling the user to select a threshold for comparison to a value generated as the function of the distance from the mark, to determine points in the image where the stroke textures are omitted.

22. A method for interactively creating an image simulating a hand-drawn pen and ink illustration, using a computer, comprising the steps of:

(a) enabling a user to select a stroke texture from among a plurality of stroke textures, each of said plurality of stroke textures comprising a plurality of individual strokes that visually convey both a tone and a texture, said plurality of individual strokes having sufficient variation in appearance to simulate corresponding hand-drawn pen and ink strokes;

(b) enabling the user to employ a pointing device to indicate a region comprising a portion of the image to which the stroke texture selected will be applied, by moving a cursor in the image over the region, simulating painting of the stroke texture in the image; and (c) rendering the image with the stroke texture specified for the region by the user, to simulate a hand-drawn pen and ink illustration.

23. The method of claim 22, further comprising the step of automatically varying at least one of a density of the individual strokes and a thickness of the individual strokes used in the stroke texture applied to a region to achieve a desired tone in the region of the image when rendered.

24. The method of claim 23, further comprising the step of automatically compensating for an area of overlap of cross-hatching strokes when achieving the desired tone, since the strokes comprising the cross-hatching strokes do not cumulatively contribute to the desired tone in the area where said strokes overlap.

25. The method of claim 22, wherein the plurality of stroke textures are included within a library of stroke textures.

26. The method of claim 22, wherein the stroke texture selected by the user is generated by the computer in accord with a predefined procedure.

27. The method of claim 26, wherein the stroke texture comprises one of stippling strokes, parallel hatching strokes, and curved strokes.

28. The method of claim 27, further comprising the step of enabling the user to determine whether the parallel hatching strokes and the curved strokes are generally aligned with an edge of a region.

29. A method rendering a three-dimensional model as an image simulating a hand-drawn pen and ink illustration, using a computer, comprising the steps of:

(a) providing data defining the three-dimensional model, said data identifying an observer position, at least one light source position, and surfaces of the three-dimensional model;

(b) enabling a user to specify a surface of the three-dimensional model;

(c) enabling the user to select a stroke texture from among a plurality of stroke textures to apply to the surface specified in step (b), each of said plurality of stroke textures comprising a plurality of individual strokes that visually convey both a tone and a texture; and (d) rendering the three-dimensional model as a simulated hand-drawn pen and ink illustration, with the stroke texture selected by the user applied to the surface specified by the user, an appearance of the texture and the tone for said stroke texture as it is rendered on said surface being determined as a function of said observer position and as a function of said at least one light position.

30. The method of claim 29, further comprising the steps of repeating steps (b) and (c) for other surfaces of the three-dimensional model before the step of rendering is implemented.

31. The method of claim 29, further comprising the steps of enabling the user to associate marks with selected surfaces in the three-dimensional model, and to specify an indication threshold, a detail with which the stroke textures on the selected surfaces is rendered being determined as a function of a distance from the marks and of the indication threshold.

32. The method of claim 29, further comprising the step of automatically selectively applying stroke textures in adjacent regions of the three-dimensional model as a function of the observer position and of said at least one light source position, to delineate an edge between the adjacent regions when the three-dimensional model is rendered as the simulated hand-drawn pen and ink illustration.

33. The method of claim 29, further comprising the step of automatically employing an outline stroke to define a boundary between two adjacent surfaces if the tone of each of the two adjacent surfaces, for the stroke textures applied thereto, is not sufficiently different when the three-dimensional model is rendered, to delineate the boundary between the two adjacent surfaces.

34. The method of claim 29, further comprising the step of automatically omitting an outline stroke between two adjacent surfaces as a function of the lighting direction.

35. The method of claim 29, further comprising the step of automatically including thickened outline strokes for edges of surfaces that cast a shadow and omitting outline strokes for edges of surfaces that are fully illuminated, as a function of the lighting direction, when rendering the three-dimensional model.

36. A method for interactively creating an image simulating a hand-drawn pen and ink illustration, using a computer, comprising the steps of:

(a) enabling a user to specify a stroke texture comprising a plurality of individual strokes that visually convey both a tone and a texture, said plurality of strokes being divided into different sets of strokes, wherein a predefined priority is associated with each set of strokes comprising the stroke texture;

(b) enabling the user to indicate a region in the image to which the stroke texture specified in step (a) will be applied, strokes within sets of successively lower priority being applied to the region within the image to increase the tone of the stroke texture in said region until a desired tone is achieved; and (c) rendering the image with the stroke texture specified for the region by the user, to simulate the region as it would appear in a hand-drawn pen and ink illustration.

37. The method of claim 36, wherein different aspects of the stroke texture are assigned to each set of the strokes comprising a stroke texture, a highest priority being assigned to a shape conveyed by the stroke texture, and a lowest priority being assigned to hatching strokes applied over the shape.

38. The method of claim 36, wherein based upon a priority of the strokes, the number of stroked used is varied when the image is rendered, to achieve a generally constant tone, independent of at least one of a resolution and a size of the image as rendered.

* * * * *